United States Patent [19]
Brandt et al.

[11] Patent Number: 6,101,533
[45] Date of Patent: Aug. 8, 2000

[54] MULTIPLE INTERFACE DATA COMMUNICATION SYSTEM AND METHOD UTILIZING MULTIPLE CONNECTION LIBRARY INTERFACES WITH BUFFER AND LOCK POOL SHARING

[75] Inventors: Mark Steven Brandt, Laguna Beach; Vinh Ha Le, Lake Forest; Jeffrey John Wilson, Mission Viejo, all of Calif.; Charles Austin Parker, Exton, Pa.; Sarah Knerr Inforzato; Robert Frank Inforzato, both of Downington, Pa.; Lois Bridgham Coyne, Lansdale, Pa.; Christopher John Harrer, Downington, Pa.; Susan Mary Jennion; Michael Thomas Kain, both of Chester Springs, Pa.; Frances Ann Laukagalis, Philadelphia, Pa.; James Joseph Leigh, Wyncote, Pa.

[73] Assignee: Unisys Corporation, Blue Bell, Pa.

[21] Appl. No.: 09/060,647

[22] Filed: Apr. 15, 1998

[51] Int. Cl.[7] .................................................. G06F 13/00
[52] U.S. Cl. ........................... 709/213; 709/250; 709/300
[58] Field of Search ..................................... 709/208, 210, 709/212, 213, 214, 215, 216, 230, 231, 232, 250, 300, 301, 302; 710/129, 200; 711/150, 152, 154

[56] References Cited

U.S. PATENT DOCUMENTS

| | | | |
|---|---|---|---|
| 4,965,719 | 10/1990 | Shoens et al. ........................... | 711/100 |
| 5,247,672 | 9/1993 | Mohan .................... | 711/152 |
| 5,592,622 | 1/1997 | Isfeld et al. ............................. | 709/207 |
| 5,784,622 | 7/1998 | Kalwitz et al. ......................... | 710/200 |

*Primary Examiner*—Viet D. Vu
*Attorney, Agent, or Firm*—Alfred W. Kozak; Mark T. Starr; Steven B. Samuels

[57] ABSTRACT

A high speed data communications method and system is provided whereby multiple groups of software interfaces are used to link a Distributed Systems Services Unit to a Network Provider which connects to an Input/Output Interface Module which relates to external interfaces of a Network. The interfaces permit the capability of buffer sharing and lock pool sharing, in addition to improved Connection Library Element Interfaces which reduce the overhead that was previously required and further enables faster data transfer operations with reduced latency.

12 Claims, 8 Drawing Sheets

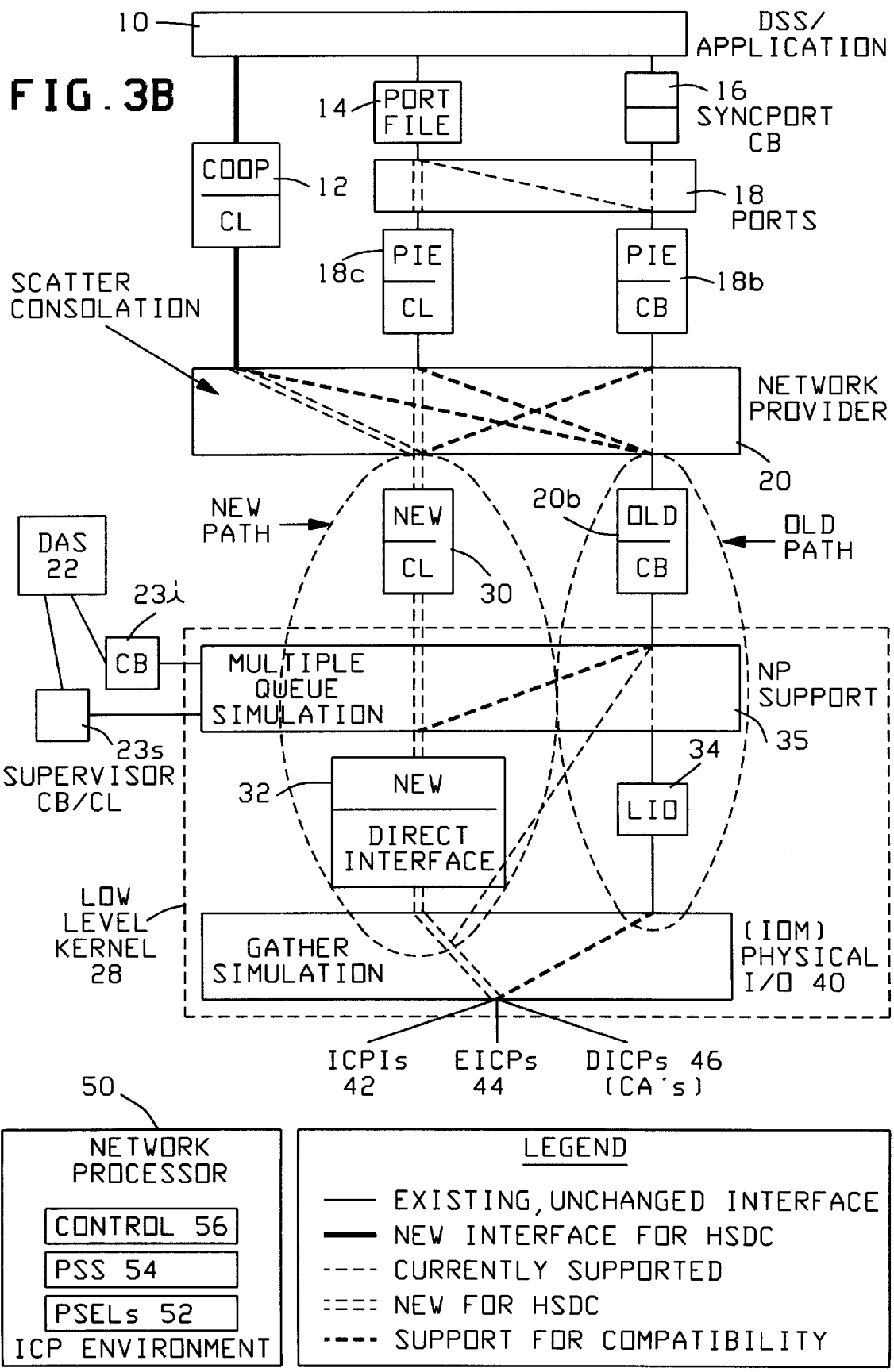

MULTIPLE INTERFACE DATA COMMUNICATION SYSTEM AND METHOD UTILIZING MULTIPLE CONNECTION LIBRARY INTERFACES WITH BUFFER AND LOCK POOL SHARING

CROSS REFERENCES TO RELATED APPLICATIONS

This application is related to co-pending application U.S. Ser. No. 09/060,650 entitled "Method and System for Enhanced Data Communications Via Input Interface of Cooperative Service Interface"; and co-ending U.S. Ser. No. 09/060,649 entitled "Output Interface Method and System for Enhanced Data Transfers Via Cooperative Service Interface"; also co-pending U.S. Ser. No. 09/060,651 entitled "Network Data Path Interface Method and System for Enhanced Data Transmission", and co-pending U.S. Ser. No. 09/060,648 entitled "Connection Library Interface System and Method for Process Inter-Communication Manager and Process Inter-Communication Element". Each of the listed co-pending applications are incorporated herein by reference.

FIELD OF THE INVENTION

The present disclosure relates to high-speed data communication systems having interfaces to provide performance improvements for Network Providers and their Users.

BACKGROUND OF THE INVENTION

In the data communication field involving computers and networking, there is a basic concept of the "dialog", which in computing circles, involves the exchange of human input and the immediate machine response that forms a "conversation" between an interactive computer and person using it. Another aspect of the "dialog" is the reference to the exchange of signals by computers communicating on a network. Dialogs can be used to carry data between different application processes, and can be used to carry data over computer networks. In computer networking, dialogs can be considered to provide data communication between application processes running on different systems or different hosts. Further, dialogs can carry data between application processes running on the same host.

There is a generally recognized OSI (Open System Interconnection) standard for worldwide message transfer communications that defines a framework for implementing transfer protocols in 7 layers. Control is passed from one layer to the next, starting at the layer called "the Application Layer" in one station, proceeding to the bottom layer, over the channel to the next station, and back up the layers of a hierarchy which is generally recognized as having 7 layers. Most of all communication networks use the 7-layer system. However, there are some non-OSI systems which incorporate two or three layers into one layer.

The layers involved for network Users are generally designated from the lowest layer to the highest layer, as follows:

1. The Physical Layer;
2. The Datalink Layer;
3. The Network Layer;
4. The Transport Layer;
5. The Session Layer;
6. The Presentation Layer; and
7. The Application Layer.

The Application Layer 7 (top layer) defines the language and syntax that programs use to communicate with other programs. It represents the purpose of communicating. For example, a program in a client workstation uses commands to request data from a program in a server. The common functions at this Application Layer level are that of opening, closing, reading and writing files, transferring files and e-mail, executing remote jobs, and obtaining directory information about network resources.

The Presentation Layer 6 acts to negotiate and manage the way the data is represented and encoded between different computers. For example, it provides a common denominator between ASCII and the EBCDIC machines, as well as between different floating point and binary formats. This layer is also used for encryption and decryption.

The Session Layer 5, coordinates communications in an orderly manner. It determines one-way or two-way communications, and manages the dialog between both parties, for example, making sure that the previous request has been fulfilled before the next request is sent. This Session Layer also marks significant parts of the transmitted data with checkpoints to allow for fast recovery in the event of a connection failure. Sometimes the services of this session layer are included in the Transport Layer 4.

The Transport Layer 4, ensures end to end validity and integrity. The lower Data Link Layer (Layer 2) is only responsible for delivering packets from one node to another). Thus, if a packet should get lost in a router somewhere in the enterprise internet, the Transport Layer will detect this situation. This Transport Layer 4 ensures that if a 12 MB file is sent, the full 12 MB will be received. OSI transport services sometimes will include layers 1 through 4, and are collectively responsible for delivering a complete message or file from a sending station to a receiving station without error.

The Network Layer 3 routes the messages to different networks. The node-to-node function of the Datalink Layer (Layer 2) is extended across the entire internetwork, because a routable protocol such as IP, IPX, SNA, etc., contains a "network address" in addition to a station address. If all the stations are contained within a single network segment, then the routing capability of this layer is not required.

The Datalink Layer 2 is responsible for node-to-node validity and integrity of the transmission. The transmitted bits are divided into frames, for example, an Ethernet, or Token Ring frame for Local Area Networks (LANs). Layers 1 and 2 are required for every type of communication operation.

The Physical Layer 1 is responsible for passing bits onto and receiving them from the connecting medium. This layer has no understanding of the meaning of the bits, but deals with the electrical and mechanical characteristics of the signals and the signaling methods. As an example, the Physical Layer 1 comprises the RTS (Request to Send) and the CTS (Clear to Send) signals in an RS-232 (a standard for serial transmission between computers and peripheral devices) environment, as well as TDM (Time Division Multiplexing) and FDM (Frequency Division Multiplexing) techniques for multiplexing data on a line.

It will be seen that present-day communication systems generally will have a high band-pass capability of data throughput for high speed network technologies which may occur at rates on the order of 100 MB per second, to 1 gigabit per second.

However, sometimes the problems of delays or latency may be high. Latency is generally considered to be the time interval between the time a transaction issues and the time the transaction is reported as being completed. In certain systems having a high latency, the round-trip time for two clients communicating with each other to complete a data request can be on the order of milliseconds.

The delays in communication due to "latency" will be seen to occur from conventional communication systems due partly to overhead in the communication layers, and generally is especially due to latency in the layers below the Transport Layer 4, i.e., Layers 3, 2 and 1. In high speed data communication systems, the Transport Layer 4 is still seen to impart substantial latency in communications.

The present Multiple Interface system and method involves specialized functions and operating sequences for enhancing the speed of dialog exchanges and for providing more efficient methods for data transfer.

A brief summary of the major interfaces in the execution of the dialog transfers for the present multiple interface technology will be discussed initially starting with FIG. 1A interfaces 12 (Co-op Service Interface), interface 30 (Network Data Path Interface) shown in FIG. 1A, plus the FIG. 1B interfaces (18*m*–20*m*); 18*e*–20*e*) designated as Process Interface Manager and Processor Interface Element-Connection Library Element Interfaces (PIM-CLE, PIE-CLE).

FIG. 1A is a schematic diagram of a high speed data communication system having an Input path and an output path, whereby a Distributed System Service/Application 10 works through a Co-operative Service Interface 12 to a Network Provider 20, whereupon the Network Provider 20 operates through a Network Data Path Interface 30 to the underlying interfaces designated Physical I/O 40 and Network Processor 50, which involves Network Interface Cards and Channel Adapters. Then additionally, as seen in FIG. 1B, the DSS/Application Unit 10 connects through the Port File 14 (FIG. 3A) to a Ports Unit 18 of the Master Control Program 80 (FIG. 3A) after which a specialized interface connects the Ports Unit 18 to the Network Provider 20 through the specialized interface designated as the PIN-CLE and the PIE-CLE which are acronyms for the Process Inter-Communication Manager-Connection Library Element and the Process Inter-Communication Element-Connection Library Element, which interfaces are respectively indicated through elements 18*m*–20*m* and 18*e*–20*e*. Further operational details of these interfaces will be developed subsequently hereinunder.

NETWORK DATA PATH INTERFACE (30)

Currently as will be noted in FIG. 3B, Unisys Corporation's computer architecture supports two interfaces to the Network Provider(s) 20—the standard user-visible interface through the Port Interface Files 14, and—a system software synchronous interface called Sync_Port CB 16 (Connection Block). Sync_Port users can avoid copying incoming data in certain cases and can make decisions about where to copy it because they are allowed to look at the data before copying.

The Sync_Port interface can also be used to eliminate processor switching in the input data path for certain applications. Often though, the strict rules about what could be processed in-line as part of notification of input, resulted in the process switch merely being moved into the Sync_Port user's code.

The BNA and the TCP/IP type Network Providers provide the Sync_Port interface (which is used primarily by COMs_PSHs and the Unisys-supplied DSS's), with a performance boost. "DSS" refers to Distributed System Services, while PSH refers to Protocol Specific Handler.

The Cooperative Services Interface (12) of FIGS. 1A, 2, 3 B and FIG. 5, provides an additional performance benefit over the Sync_Ports by allowing a Network Provider (20) and a DSS (10) to bypass the Port File (18) code in the Master Control Program 80 (MCP), by allowing it to share data and by relaxing the rules about what can be performed as part of an "input" notification.

The interface between the MCP's Port File 14 (FIG. 3B) code and the Network Providers (the PIE interface 18*c*) was earlier implemented as an old-style Connection Block 18*b*, (CB) so that by changing this to a "Connection Library" (CL), 18*c*, this provided a performance advantage by eliminating the MCP overhead required to access the entry points exported via a Connection Library (CL).

Because Connection Libraries (CL) (see Glossary) can export data items in addition to procedures, this change also allows for the Port File Code and the Network Providers to share dialog-oriented locks. Such sharing allows an elaborate lock/deadlock avoidance code, previously employed, to be simplified greatly, thereby not only improving performance, but also closing numerous of the timing windows. Sharing locks in this way also obviates the need for several of the more complex interfaces in the priorly used interfaces.

The Unisys E-mode based portions of the Network Providers (20) were previously enabled to communicate with their ICP-based (Integrated Communication Processor—Glossary item 18) components via an interface provided by the NP Support, 35, FIG. 6. The NP Support 35 (FIGS. 3A, 3B) provided a complex path Connection Block (CB) interface which the Network Providers used to get the data when they wished to send into an I/O capable buffer, and the CB generated and parsed the QSP (Queue Service Provider) protocol, in order to "multiplex" the numerous dialogs (that the Network Providers had) over a single Physical Unit Queue.

In the new, improved architecture, "multiple queues" are now provided between the Unisys E-mode environment and a given Channel Adapter (CA) environment, thus obviating the need for this previous multiplexing function and eliminating the de-multiplexing bottleneck on the NP/Controller stack on the input.

Since the QSP (Queue Service Provider) protocol generation is very simple, that function is now moved into the Network Provider, 20. This re-distribution of function allows the NP Support 35 (FIG. 3B) to be "eliminated" from the Data Path. In fact, the double-dashed line through the NP Support 35 (FIG. 3B) is now accomplished by means of a Read/Write directly to the Direct Interface procedure 32 (FIG. 3B) providing transport to the Network Processor 50 environment except in the case of the old Integrated Communication Processors (ICPs), where multiple queues still must be simulated in the NP Support 35, FIG. 3B.

To avoid the necessity of copying data in order to assemble Network Provider-generated header data, and data from multiple-use buffers into one contiguous memory area, the ability to "Gather" data from multiple buffers on the output is added to the I/O processor in Input/Output Module ION 40. The Physical I/O 40 (IOM) simulates "Gather" in cases where the I/O processor does not support it directly.

Additionally, a "Scatter" feature is provided so that a single incoming data message can be split across multiple buffers. This is used by the Network Provider(s) to ease their memory management problems, and they thus have a consolation code channel (in Network Provider NP 20, FIG. 3B) to cope with the cases where Scatter is not provided by the I/O processor, in IOM 40.

As a result of the improvements to the Network Data Path Interface 30, there is a reduced need to copy data, throughput performance is enhanced, more transmissions can occur simultaneously by reducing routing overhead at destination end points, there is a greater capacity for multi-threading and the protocol stacks can more efficiently handle the use of buffers.

FIG. 3B shows a specialized drawing of FIG. 3A where a number of interfaces are shown between DSS 10 and the Network Provider 20. The Cooperative Service Interface 12 with Connection Library (CL) connects directly between the DSS 10 and the Network Provider 20. The DSS 10 also has connections to Ports 18 through the Port File 14 and also via the Sync Port Connection Block 16.

Ports Unit 18 provides two types of connections to Network Provider 20. These are seen as the PIE-CL 18c (Process Inter-Communication Element Connection Library) and also the PIE-CB 18b (Process Inter-Communication Element Connection Block). Further in FIG. 3B, there is seen the low level kernel 28 which has the Network Processor Support (NPS) Unit 35 which connects to Physical I/O 40 through the Logical Input/Output, LIO 34. Additionally, the Network Processor Support Unit 35 also connects to the Physical I/O 40 via the new Direct Interface 32.

FIG. 3B shows the elliptical dotted lines indicating the "old" prior data transfer pathway which involved the Connection Block 20b, the NP Support 35 and the Logical I/O 34. Similarly, an elliptical dotted line indicates the "new" path interface 30 which involves the new Connection Library (CL) System which also operates through the Network Processor Support 35 and through the new Direct Interface 32 over to the Physical I/O 40 (Input/Output Module, IOM).

The Physical I/O 40 communicates with a number of processors which are indicated as Network Processors such as the Integrated Communication Processor 42, the Emulated Communication Processor 44 and the DICP 46 (the Direct Integrated Communication Processors) each of which can include the Channel Adapters (CA).

The Network Processors (FIGS. 3B) are involved in a Network Processor environment 50 which utilizes a Control Unit 56, a Path System Service 54 and a Path Select Unit 52.

As seen in FIG. 3B, a Network Provider 20 provides for "Scatter Consolation" functions and further indicates various data paths which are indicated with the dotted lines to indicate support for compatibility and the small dashed lines which indicate the new paths for high speed data com operations.

Likewise, the Network Processor Support (NPS) Unit 35 enables multiple queue simulation functions and also indicates, via the small dashed lines, channels for high speed data communications. The heavily dotted lines indicate support for compatibility between the new Connection Library (CL) system and the old Connection Block (CB) system.

A Distributed Application Supervisor (DAS 22) connects to the Provider 20, while also providing output to a path input control 23i (for prior path CB), 23i, and a Supervisor CB/CL control 23s. These last two blocks feed to the Network Processor Support Nodule 35, which provides an output to the Logical I/O (LIO 34) and to the Direct Interface 32, and thence to I/O 40, whereby the Physical I/O 40 is a Simulation "gatherer" to provide output to: the Integrated Communication Processor 42; or the Emulated Integrated Communication Processor 44; and/or to the Direct Integrated Communication Processor 46, which provide communication to Channel Adapters (CA) in a Network Interface Card (NIC) of Network Processor 50. The DAS 22 communicates with software in the Network Processor Environment 50.

The Network Processor Environment designated 50 of FIG. 3B is an architectural drawing showing the software contents of a Network Processor which provides the system with a Control 56, Path Subsystem (PSS) 54, and Protocol Stack Extension Logic (PSEL 52). This Network Processor environment includes processors 42, 44, 46.

Thus in summary, the architecture of FIG. 3B additionally shows the old data path through the Connection Block 20b which is now supplanted by the new data path 30 which utilizes the Connection Library (CL). However, as was indicated earlier, the architecture of FIG. 3B may permit the use of the old path in addition to the use of the new path in order to provide compatibility for older systems which are not oriented to the new Connection Library Data Path Interface.

SUMMARY OF THE INVENTION

A multiple series of cooperating interfaces are used to provide a high speed data communication system and method. These multiple cooperating interfaces; (i) a Cooperative Services Interface 12 between a DSS/Application Unit 10 and a Network Provider 20; (ii) a Network Data Path Interface 30 between a Network Provider 20 and an Input/Output Module 40; (iii) a PIM/PIE interface (Process Inter-Communication Manager/Process Inter-Communication Element-Connection Library) (18m–20m; 18e–20e).

This inter-cooperating sequence of interfaces enables the Cooperative Service Interface 12 to enable buffer sharing and also to enable lock sharing and transfer of message dialogs between the DSS 10 and the Network Provider 20.

The Network Data Path Interface provides enhanced data transfer capabilities between the Network Provider 20 and the Input/Output Module (ION 40) which communicates with external interfaces, such as Integrated Communication Processors and Channel Adapters. The Network Data Path Interface can operate more efficiently by eliminating the need for a Network Processor Support Unit which was an earlier requirement of such data transfer systems, and now further helps eliminate much overhead and reduces latency for data transfers.

The PIM/PIE-CLE (Process Inter-Communication Manager-Process Inter-Communication Element-Connection Library Element) provides communication enhancements between a Network Provider 20 and a Ports Unit 18, which is part of the Master Control Program 80 of a computer system. With the use of the new Connection Library interfaces, the Ports Unit 18 can communicate with the Network Provider 20 in a more efficient manner which reduces latency and requires less software overhead. The Connection Library Element methodology also functions to allow the Ports Unit 18 and the Network Provider 20 to share buffer pools and also to share lock pools, thus eliminating the need for extra buffers and lock pools in addition to further reducing latency in data transfer operations.

BRIEF DESCRIPTION OF THE DRAWINGS

FIG. 3B is a specialized drawing of a data communication system showing a new form of Network Data Path Interface using the new Connection Library Interface while maintaining compatibility to a system also supporting an earlier Connection Block Interface;

GLOSSARY LIST

Figure 1A:
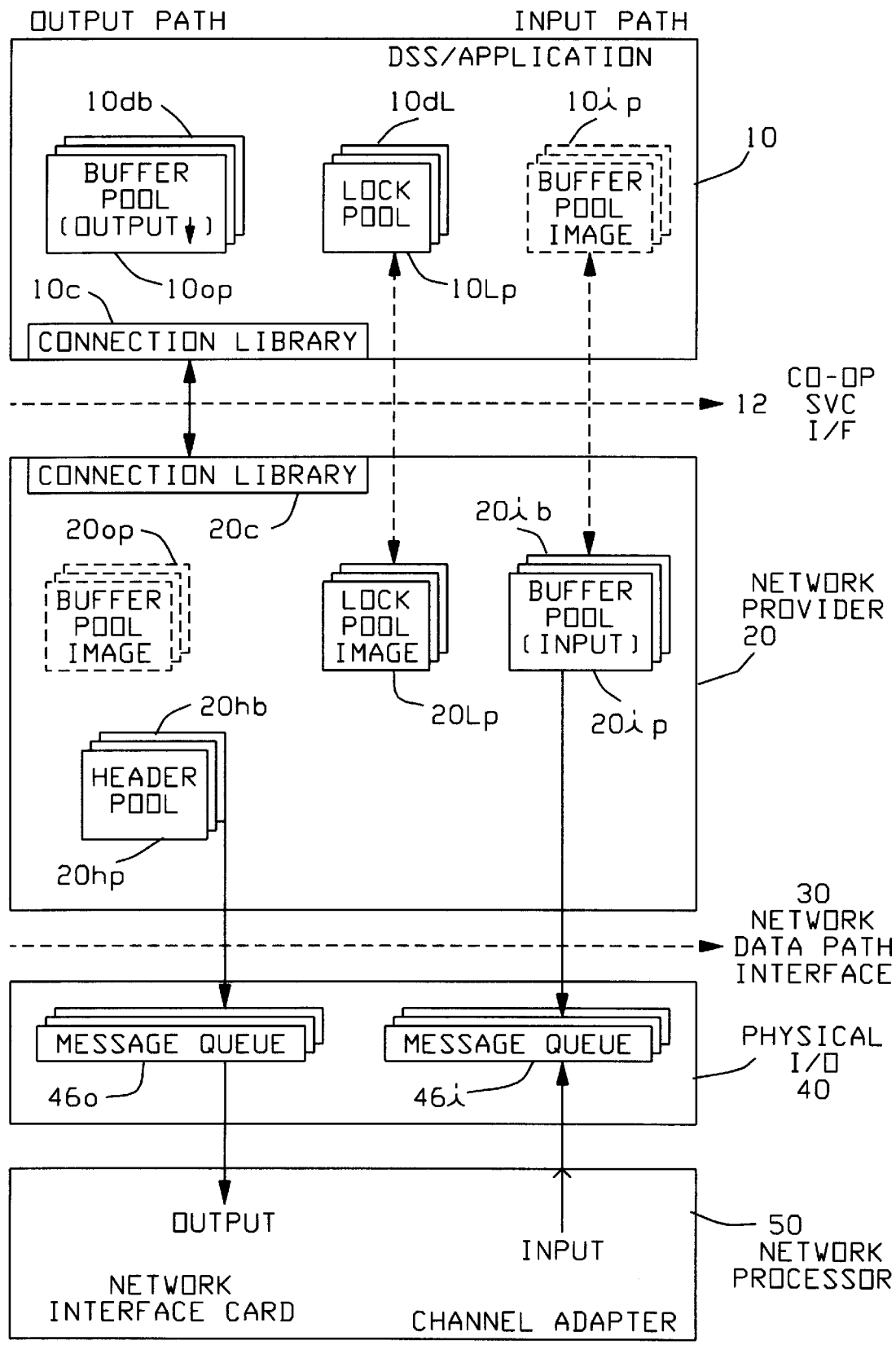
FIG. 1A is a drawing of a high speed data com system having a series of specialized interfaces which reduce overhead and latency.

1. Distributed System Services (DSS): One of a collection of services provided on Unisys Host computers to support communication across multi-host networks. DSSs can be services such as file handling, station transfer, and mail transfer.
2. Cooperative Service Interface (Co-op): A systems level, connection-library based interface which allows the Distributed System Services (DSS) to communicate across the network with their peers. A system and method for using the services of a network provider to communicate with another instance of themselves somewhere else enabling communication to occur across a network.
3. Connection Library (CL): This is method of connecting two code files together at run time so that they can use each other's services. The Connection Library is a collection of one or more Connection Library Elements and a library template. The "Library Template" is a structure that is built by the compiler and maintained by the Master Control Program (MCP) that determines what the procedures and functions and items that you are trying to import from the library. This involves a multiplicity of Connection Library Elements. A Connection Library (or Server Library) permits access to another program's exported procedures and data. Connection Libraries allow one or more instances of two-way access, to the other program, and from the other program to the Library. Server Libraries allow only one instance of one-way access.
4. The Port File: A Port File is an interface that allows programs to talk to their peers on the same system or other systems and which is based on the file interface. The "file interface" is used for disks, tapes, and card readers and all the traditional peripheral types and the Port File provides adaptation of that interface for interprocess communication (IPC).
5. Sync Port Connection Block (CB): This was an older version of the cooperative interface which did not permit lock sharing or buffer sharing. Connection Block later evolved into more versatile operations as Connection Libraries and likewise the co-op interface was the evolution of improvements to the Sync Port Interface. The Sync Port Interface uses connection blocks while the more highly developed co-op interface uses Connection Libraries whereby the new co-op interface used buffer sharing, lock sharing and fault management.
6. Provider: Provider is just a system or operation or a piece of software that provides a service. It could be looked at as a collection of software that provides a service.
7. Process Intercommunication Element-Connection Library (PIE-CL): This is the interface used by the port interface software to talk to the Network Provider.
8. Process Intercommunication Element-Connection Block (PIE-CB): This is an interface used by the port interface software to talk to the Network Provider using an earlier form of technology designated as the Connection Block technology. The old PIE-CB technology did not provide for lock sharing and buffer sharing but the new PIE-CL (Connection Library) does provide lock sharing and buffer sharing.
9. Scatter Consolation: This is code is put into NP Support software to make a machine which does not have hardware scatter capabilities appear to have scatter capabilities. Scatter is the operation of taking data coming in off an I/O bus and putting it into multiple different areas in the local memory, that is to say, it is scattered around.
10. Distributed Application Supervisor (DAS): This is a unit that has a function of determining what software should be loaded into the Channel Adapter, into the integrated communications processor (ICP) etc. It also is used to manage exceptions that it may notice, for example, such as software that is running in the ICP, which may detect some error and then the DAS must determine how to handle the error.
11. Network Support: A process which controls when Network Providers and DSSs are initiated and terminated and which routes network-related operator entered commands and their responses.
    11a. NP Support: Network Processor Support. The software which allows Network Provider access to the Input and Output Queues, which contains Multiqueue Simulation software, and which multiplexes and demultiplexes data across the single input and output queues used in an earlier method of implementation of functions for a Network Data Path Interface.
12. Multiple Queue: There are I/O queues between the host memory and Channel Adapter card. The present system can define up to 16 queues in its I/O architecture which is an advantage over the earlier use of only two queues which involved one queue for input and one queue for output. Putting in multiple queues, gave each module a direct queue so that there was no need for multiplexing over one queue and then de-multiplexing on the other end. Thus, now each receiver would have its own queue.
    12a. MQ simulation software is in NP Support which "simulates" Multiple Queues on systems where the hardware does not support multiple queues.
13. Connection Block (CB): This is a method of connecting two code files together at run time so that they can use each other's services. It is similar to a file or a task or a job or a database or any of these types of abstract objects that are used in a given program. A CB is a less robust implementation of a Connection Library (CL).
14. Supervisor CB/CL: This involves the supervisor Connection Block/connection library and this is the interface object that the NP Support uses to talk to the Distributed Application Supervisor (DAS).
15. Physical I/O: The Physical I/O system is part of the Master Control Program of the Unisys computer system hierarchy. This involves the software that talks to the hardware controllers. For example, it operates so as to indicate that it wants sector 35 off disk 22 and seeks 57 bytes from that location.

16. Logical I/O (LIO): Logical I/O is also part of the Master Control Program (MCP) and involves the file interface code. Whenever writing is done to a file or read from a file in a program, the system is actually calling the MCP module called Logical I/O. The Port File interface code is also a subpart of Logical I/O. It has its own module but provides Logical I/O functions for the Port Files. The regular Logical I/O operates with disks, tapes, printers, card punches and other peripherals.

17. Gather Simulation: This is provided by code in the physical I/O. Gather is an output operation whereby the I/O management module goes to the memory and gets certain messages or data from one location and then from another location and from another location and puts it together in order to pass it on to a particular peripheral such as a tape.

Contrarily, the "scatter" operates the other direction, for example, the IOM will indicate that it has a stream of bits from a particular tape and it is then going to put some of this information here in one place, some of it here in another place and some of it in another or third place and that is the "scatter" operation.

18. Network Processor: Examples of these units are Channel Adapters, Integrated Communication Processor (ICP), Emulated Integrated Communication Processor (EICP), Network Providers (NP), DICPs and Network Interface Cards. An integrated communication processor is often called a Data Link Processor (DLP) and, in particular, ICP is a Data Link Processor that has a Network Interface Card (NIC) associated with it. Channel Adapters also have Network Interface Cards.

18a. An emulated ICP is a portion of software that "pretends" to be the Network Interface Card on a system that operates on the basis of emulating the I/O mainframe system, such as was done in the Unisys Micro-A or Unisys A-7 and other systems. These systems do not supply any real I/O hardware but rather provide software that emulates the hardware. Thus an emulated ICP is a portion of software that pretends to be and operate as if it were ICP/DLP.

18b. Direct Integrated Communication Processor (DICP): The DICPs are also actually known as "Channel Adapters" and they are the units that replace the datalink processors (DLP) in the new I/O architecture. Thus a direct integrated communication processor is a Channel Adapter that does networking operations.

19. Interfaces—Cooperative System Services: They involve (i) input data path for dialogs associated with the Connection Library between the Network Provider and the DSS; (ii) an output data path for dialogs associated with the Connection Library between the DSS and the Network Provider.

20. Channel Adapters (CA): A Channel Adapter is a device that enables hardware using two different types of communication channels to communicate.

21. Path Sub-System (PSS): This is the peer of NP Support that runs in the integrated communication processor (ICP), the emulated integrated communication processor (EICP) or the direct integrated communication processor (DICP). This is the unit that the NP support talks its protocol to.

22. Protocol Stack Extension Logic (PSEL): This is part of the network provider involving its protocol stack that runs in the integrated communication processor (ICP).

23. COMS: This represents a communications management system. It is a Unisys message control system that supports processing for a network on the Unisys ClearPath NX server. It is described in the reference: Unisys A Series Communication Management System (CMS) operations guide, May 1989, Doc. 1154523.380.

24. Protocol Specific Handler (PSH): This is software which talks to items such as communication processors in order to get terminal access.

25. Network Selector Nodule (NSM): This is part of Ports Module in the Master Control Program (MCP).

Its purpose is to take a user's File Open Request, a Port File, and determine which Network Provider that should be used. The Network Selector Module 9 (FIG. 3A) selects a Network Provider 20 to use for a specific instance of the port interface.

26. Library Template: A structure built by the compiler and maintained by the NCP to determine the procedures, functions and items to be imported from the Connection Library.

27. Pipe: A pipe is a path (input or output) between a Network Provider and the Channel Adapter/Integrated Communications Processor (CA/ICP), which is associated with a specific end point. A pipe can be associated with a connection end point on the ICP/CA for output or to a specific entity end point (upper layer protocol) in the Network Provider for input. The use of pipe is defined by the Network Provider and the CA/ICP and the QSP IDs which are used to uniquely identify each pipe. QSP refers to the Queue Service Provider. A pipe may or may not map directly to a specific queue.

28. Queue: A queue number identifies a specific I/O queue relative to a particular ICP/CA (Integrated Communications Processor/Channel Adapter). Each queue is an independent list of I/O requests. Within each queue, requests are ordered. There is no ordering of requests in different queues. The ICP/CA is given one request at a time (the one at the head of the list) from each queue.

29. Queue Service Provider (OSP): This is a unit that provides the queue service to a requester. It is basically a protocol that puts everything into one queue and takes it all back off. That protocol is called QSP protocol (Queue Service Provider).

30. Pipe ID: A field in the QSP protocol which identifies the logical pipe. It is used for multi-queue simulation.

31. Dialog: A dialog or dialogs are operations which carry data between different applications processes.

Dialogs can be logically set to carry data over a computer network. In a computer network, dialogs provide data communication between application processes running on different end systems or hosts. Dialogs can also carry data between application processes running on the same host. Dialogs are implemented by the use of the various functional layers for example, Application, Presentation Session, Transport, Network, Link and Physical, which are used in data communication networks to provide various services and also reliability. Each layer will have its own particular protocol and range of fundamental instructions in order to provide services. Dialog operations and particular features may sometime include the scatter support and gather support.

32. Connection Library Element: This is one element of the Connection Library which may involve multiple elements. It provides implementation of an interface, much like the FILE object in a program not the actual file on disk, but rather it is an OBJECT in the program that allows access to an actual file on the disk.

33. Network Provider: A software operation which implements the Presentation, Session, Transport and Network Layer portions of the relevant protocol stack in the MCP environment.
34. Lock: An object which can be used to ensure that only one entity is accessing a shared resource or object at any given time.
35. PIE-CL: Process Inter-communication Element for the Connection Library. (See item 7)
36. PIE-CB: Process Inter-communication Element for the Connection Block. (See item 8)
37. PIM-CL: Processor Inter-communication Manager for Connection Library.
38. PIN-CB: Processor Inter-communication Manager for Connection Block.
39. Open_Sequence: is a protocol dependent exchange of messages which establishes a dialog.

General Overview

To place the present Multiple Cooperative Interfaces in perspective, a brief review of the overall context of multiple computer systems and networks will be described in connection with FIG. 3A.

Figure 3A:
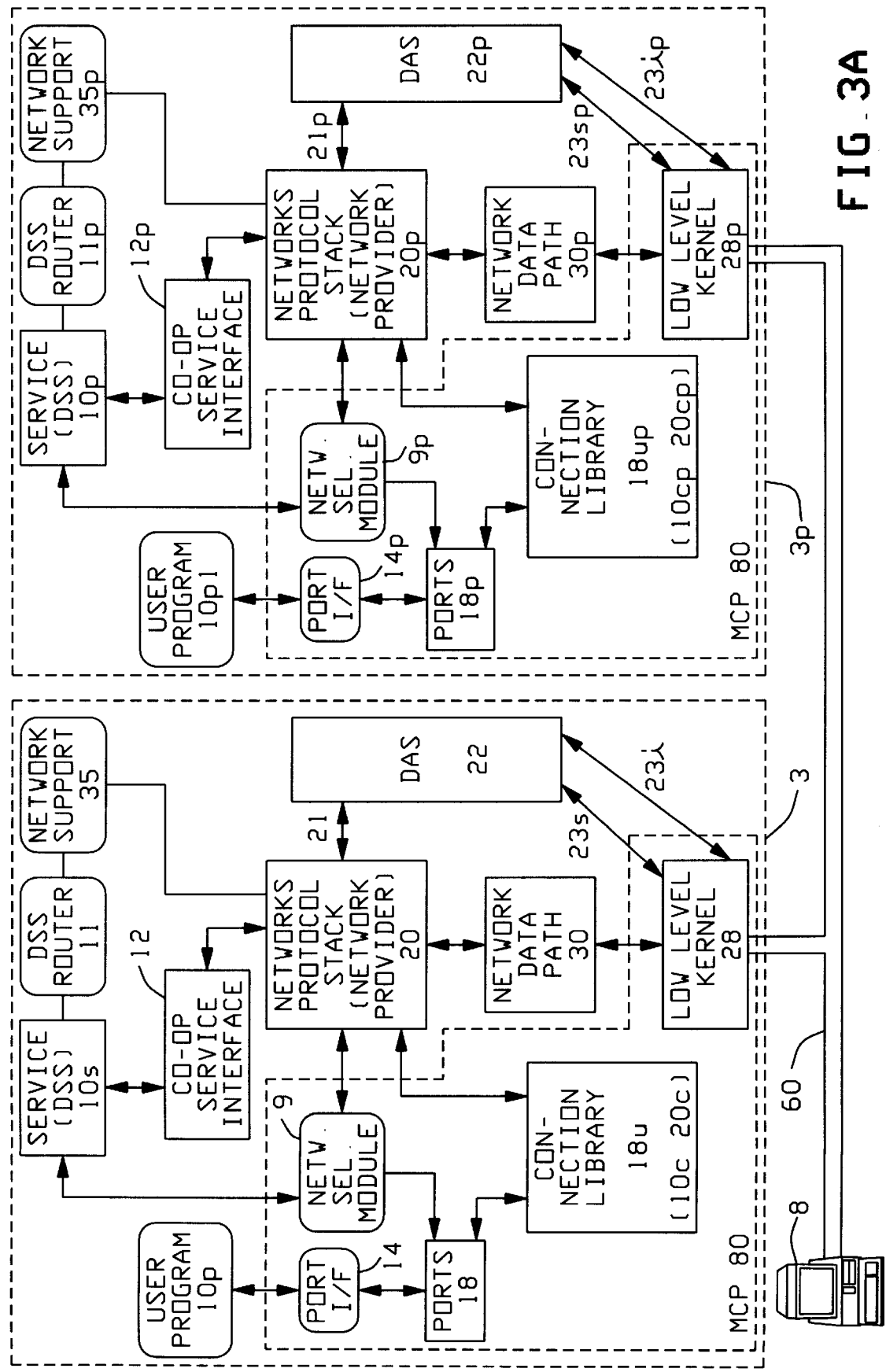
FIG. 3A is a multiple peer network drawing showing the placement of a PIN/PIE CL (Connection Library) Interface in each two peer systems on a computer network.

FIG. 3A is an overview of specialized high speed data com system where a User terminal 8 utilizes the interconnecting bus 60 to connect to a first computer system 3 and a second computer system 3p which is basically a duplicate copy of the first network.

There are different categories of elements involved in FIG. 3A which can be summarized as follows:

(a) Network Providers designated NP, which may involve the TCP/IP protocol, or other protocols.
(b) The Users of the Network Providers, such as the DSSs (Distributed System Services), CONS (Communication Management System), and PSHs (Protocol Specific Handlers) which interface terminal-related protocols to the CONS program defined in the Glossary, (item 23).
(c) Master Control Program (MCP), which is the main operating system of which one portion includes the Network Selector.
(d) The Network Support items, such as the interface to the Network Selector, the DSS Router Interface, and the network software installation and configuration.

Referring to FIG. 3A, it will be seen that each computer system 3 and 3p is composed of correspondingly similar modules which can be described below for example, in connection with the network 3, of FIG. 3A.

The User terminal 8 will communicate with the low-level kernel 28 of computer system 3 which is in communication with the network data path 30 which communicates with the network's protocol stack 20 (Network Provider). The network's protocol stack 20 has a communication line 21 to the DAS 22, (Distributed Application Supervisor) which has two communication lines to the low-level kernel 28, these communication lines being shown as 23s and 23i. The network protocol stack 20 communicates to a Connection Library 18u which connects to the Ports Module 18. The Ports Module 18 is in communication with the Port Interface 14 which is in communication with the User program 10p.

FIG. 3A involves a service networking operation, where for example, there are two peer computer systems 3 and 3p. One computer system such as computer system 3 will have a User terminal 8 which connects to it, and also connects to the second computer system 3p.

For example, the User terminal 8 may have a payroll application program, while the databases for this may reside in computer system 3 or computer system 3p.

The low-level kernel 28 and 28p are software interfaces which connect to the computer networks. In the User terminal 8, there could be an equivalent interface called the Network Interface Card.

Each of the computers contain multiple protocol engines, each of which supports a protocol, such as TCP/IP, UDP (User Datagram Protocol) and other internet protocols.

The Ports 18 and 18p are file interface-based software which allows programs to send messages to other programs across the network, so that programs can talk to other programs. The software in the Port Interfaces 14 and Ports 18 are basically located in the MCP 80 or Master Control Program, and they operate as system software within the MCP, 80 FIG. 3A.

The operations of FIG. 3A function such that the computer system 3 could become a sender and send a message to computer system 3p which could become a receiver, after which the computer system 3p becomes a sender and sends back an answer to computer system 3 as the receiver.

In FIG. 3A, each of the computer systems 3 and 3p will have a DSS Router 11 and Network Support Module 35. Further, Port 18 associated with Port Interface 14, is placed in communication with a Network Provider 20 by the Network Selector Module 9.

It should be understood that the computer system 3 and the system 3p may be a long distance apart, such as in different cities or different countries.

The Port Interfaces 14 and 14p are described in the Unisys I/O Subsystem Programming Guide, Document number 86000056, published June 1995.

Figure 2:
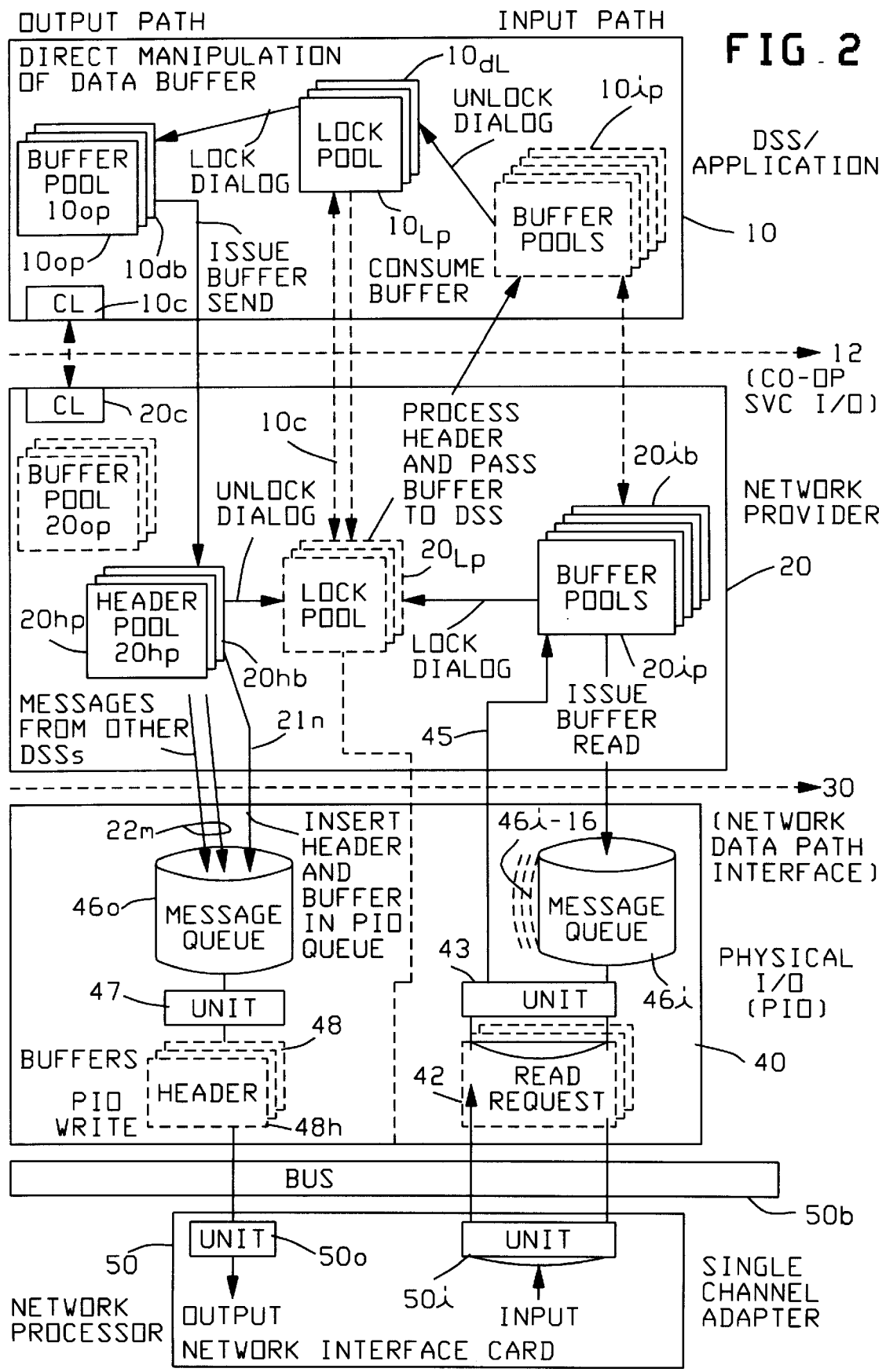
FIG. 2 is a networking software architectural diagram used to illustrate elements and functions of a Cooperative Service Interface (12) and which receives Inputs and sends Outputs via a Network Data Path Interface (30) to a Network Processor Environment (50)
Figure 5:
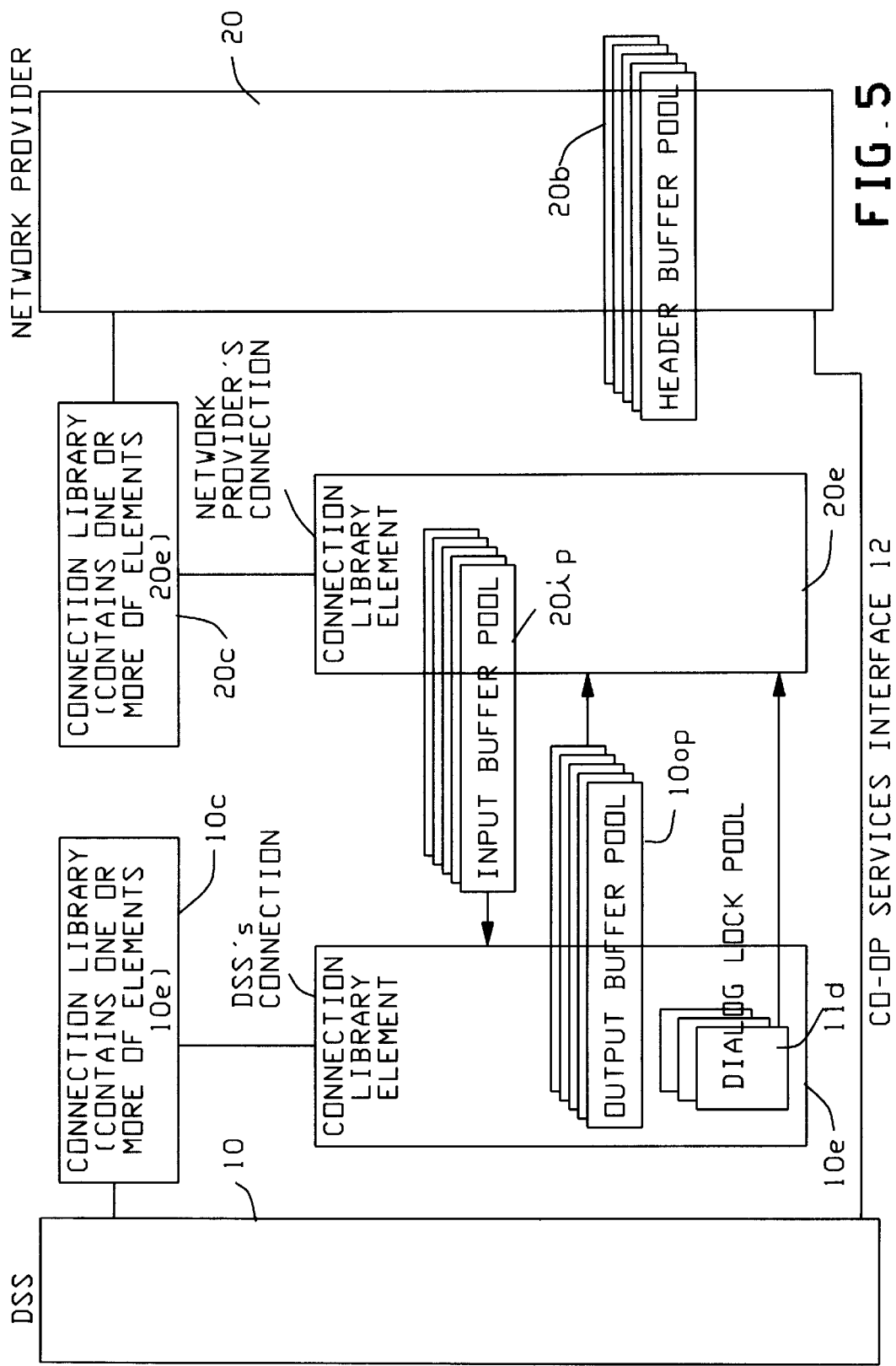
FIG. 5 is a diagram illustrating how buffers and locks are shared between a Distributed System Service (DSS) and a Network Provider (NP) using a Connection Library facility of a Cooperative Service Interface.

As seen in FIG. 5 and FIG. 2, there is a Cooperative Service Interface method and system 12 which involves the transfer of dialog messages between a Distributed System Service (DSS) 10 and a Network Provider 20.

The DSS/Application 10 can generally be any software program, but typically is an implementation of the "Application Layer" (Layer 7) which defines the language and syntax that a program uses to communicate with another program as part of the OSI (Open Systems Interconnection Standards). The Application Layer may involve services such as FTP (File Transfer Protocol), FTAM (File Transfer and Management) and messaging protocols such as mail, Telnet and other terminal access protocols.

The Network Provider 20 of FIGS. 2, 3A and 5, is also often referred to as Network Transport Protocol Implementation such that the Network Provider (NP) is an implementation of the hierarchical layers (6,5,4,3) "below" the Application Layer 7. The Network Provider thus implements the protocol stack for the lower layers such as TCP/IP, UDP/IP, BNA or the OSI Presentation layer down.

The Network Provider 20 encompasses the Presentation (Layer 6), the Session (Layer 5), and the Transport (Layer 4), and where the Datalink (Layer 2) is implemented in a Network Processor in the Network Interface Card 50 of FIG. 2. The Network (Layer 3) is typically implemented in the Network Provider, but also may be implemented in the Network Processor.

The Cooperative Service Interface 12 and its method of operation will be seen in the broad view of FIG. 3A, as the interface between the Service Module 10s, also called "DSS" (Distributed System Service), and the Network Provider 20, also called the "Network Protocol Stack". Thus, the Cooperative Service Interface 12, is the programmed interface of interconnecting operational activities between the DSS 10 and the Network Provider 20, of FIG. 1A.

A brief overview of the Cooperative Service Interface 12 is shown in FIGS. 2 and 5 where the Distributed System Service 10 is interrelated to the Network Provider 20 through use of a set of buffer pools, and a lock pool.

Thus, in FIG. 5, the DSS 10 has a Connection-Library Element 10e, which has a dialog lock pool 11d, a reference to which is transmitted to the Network Providers Connection-Library Element module 20e. A Connection Library $10_c$ contains the DSS's Connection Elements 10e.

Further, the Network Provider 20 has a header buffer pool 20b which is associated with the Network Provider's Connection Library $20_c$. The Connection-Library Element 20e has an input buffer pool $20_{ip}$, whereby data is made available (shared) to the DSS Connection-Library Element 10e. Likewise, the DSS Connection-Library Element 10e has an output buffer pool $10_{op}$, whereby data is made available (shared) to the Network Provider's Connection-Library Element 20e. The Connection Library 20c contains the Network Provider's Connection Elements 20e.

The basic functional design of the High Speed Data Com (HSDC) using a Coop Service Interface 12 and Network Data Path Interface 30 is seen in FIG. 2 with utilization of the Connection Libraries 10c, 20c (CL) of FIG. 2 which use the elements 10e and 20e of FIG. 5. The general purpose is to implement performance improvements for Network Providers.

The improved Network Data Path Interface 30 (FIG. 1A) consists of the interface functions between the Network Provider 20 (NP), and the Physical I/O 40. The NP 20 (Network Provider), communicates (in FIG. 3B) with the Path Subsystem 54, the Physical I/O, 40, and the Controller 56, in addition to Protocol Specific Extension Logic (PSEL), 52 (FIG. 3B).

Figure 1B:
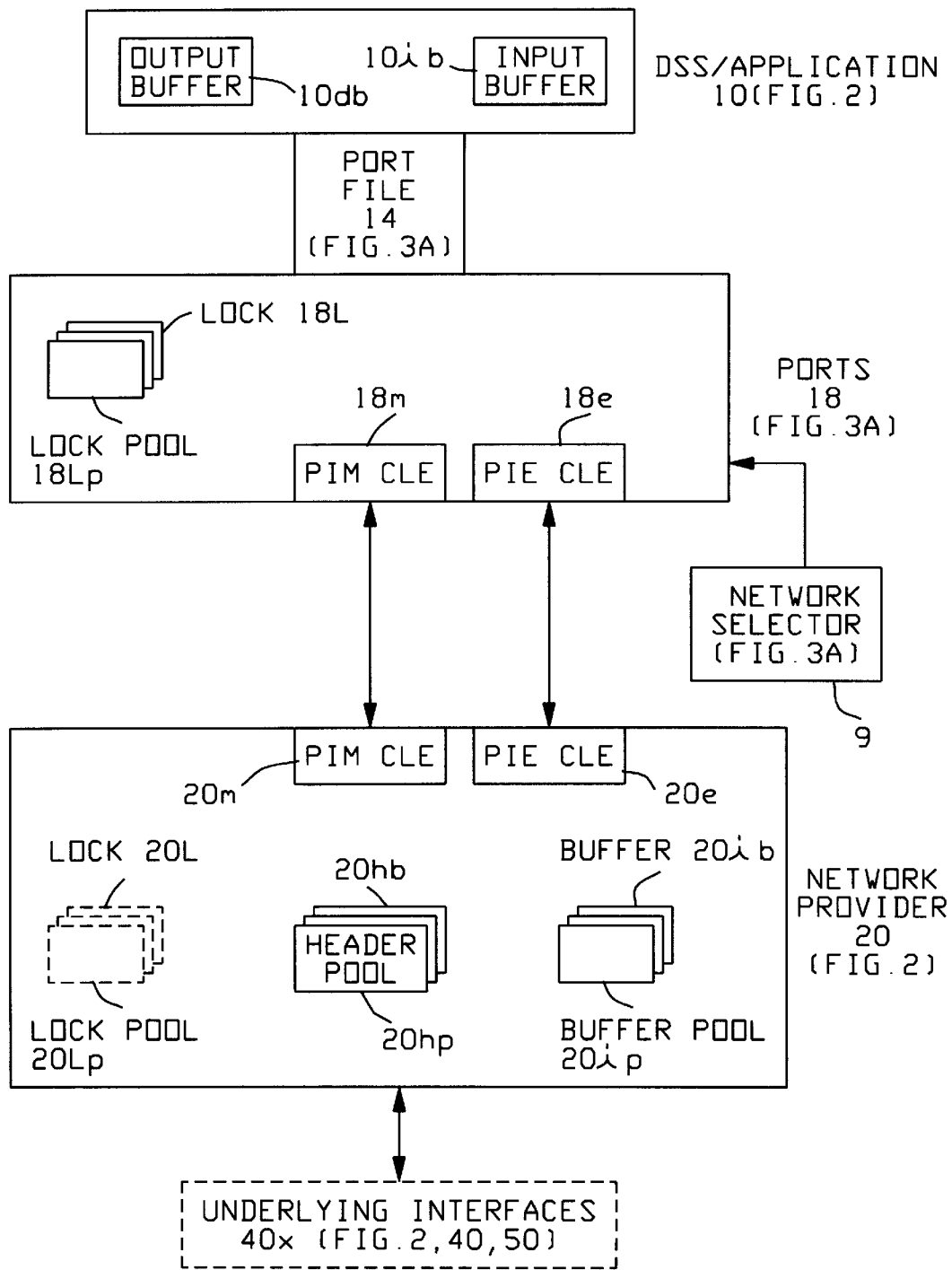
FIG. 1B is a drawing of the improved Connection Library Element PIM-CLE, PIE-CLE Interface.

The PIM/PIE CLE Interface implementation of FIG. 1B includes:

(a1) moving buffer management responsibility from the prior Network Processor Support 35 (FIG. 3B) over to the Network Provider 20, or to the DSS 10 (Distributed System Service). In effect, the need for the Network Processor Support 35 of FIG. 3B is eliminated.

(a2) replacing the current Connection Block Interfaces with Connection Library interfaces which use CLE's (Connection Library Elements).

(a3) providing support of multiple unit/pipes.

(a4) providing support of Multi-Area functionality in the Physical I/O.

FIG. 1A is a generalized diagrammatic sketch showing the relationship of the Network Data Path Interface function 30 to the DSS 10, the Network Provider 20 and the Cooperative Service Interface 12 which cooperate to enable Input data transfers and Output data transfers from and to the message queues of the I/O 40 and Network Processors 50 which supports Channel Adapters (CA's). The detailed operational functions are later described in connection with FIG. 2 which involves a more detailed description of the improved high speed data com operations.

Area Involvement

The implementation of this data con system involves the following entities:

(i) Network Processor Support 35 (FIG. 3B) (now eliminated, except for compatibility, when added for use with earlier systems);

(ii) Network Providers 20 (TCP/IP, BNA, SNA).

(iii) DSS (Distributed System Services), 10.

(iv) Channel Adapters, Controller, Path Subsystem of the Network Processor Environment 50.

(v) MCP 80 (Master Control Program) (FIG. 3A).

Hardware Compatibiltiy

This system will provide for a relationship between the Multi-Area I/O feature, plus the Unisys Corporation A-Series physical I/O model, in addition to providing relationships between multiple pipes and the Integrated Communication Processors with Channel Adapters (ICP/CA).

Compatible Software

The High Speed Data Com (HSDC) version of the Network Processor's Support 35 runs on earlier versions of Master Control Programs 80 (MCP). The QSP (Level 2) is only supported on E-mode level Gamma and Delta systems running the NCP containing the High Speed Data Com changes provided herein. Network Providers and the Channel Adapter (CA) firmware are required to be at the same level. QSP refers to Queue Service Provider.

Special Features: Network Data Path Interface (30)

1. New faster lower level interfaces between Network Providers and Physical I/O. This puts some added burdens on the Network Provider, the least of which requires that I/O length be appropriate for the device. FDDI Channel Adapters (CA) require I/O lengths to be "even multiples" of 4 bytes.

2. Certain IOMs are changed to support the Multi-Area I/O.

3. A rudimentary memory management support for the Multi-Area capable buffers are provided.

4. Channel Adapters can support 16 Physical I/O queues instead of the prior two queues.

Functional View

The new Network Data Path Interface 30 shows a lower level interface than was provided in prior implementations. In the new Network Data Path Interface, Network Providers 20 will deal directly with the Physical I/O 40 bypassing the Network Processor Support 35 and its associated overhead. The Network Processor Support 35 can optionally remain only to handle device ownership issues, to assist in initializing IOCBs (Input/Output Control Blocks), buffers and event references, and also to provide support for providers which still use the earlier-type interfaces.

The prior existing limit of two queues (one Input, one Output) between the E-mode environment and the Channel Adapter (CA) environment has now been expanded to 16 (15 for Input, 1 for Output), and these queues are statically assigned to various Network Providers. This eliminates a layer of routing in the Data Path and allows for more than one worker stack to process Input from a given device as required.

A "Gather Capability" is now added to the IONs (Input/Output Modules) to allow sending of data contained in up to three separate 3-mode arrays without need for copying. This is particularly helpful for networking, which often deals with several layers of header and control information, in addition to the user data or to the DSS supplied data.

Description of the Preferred Embodiment

FIG. 1A shows the major interfaces between the DSS 10 and the Network Provider 20 which is indicated as the Cooperative Service Interface 12, and further shows the Network Data Path Interface 30 which operates between the Network Provider 20 and the Physical I/O 40.

The buffer pool 10op and the lock pool 10Lp and the header pool 20hp and the buffer pool 20ip of FIG. 1A, are subsequently operationally described in connection with FIG. 2. Likewise, the buffer pool image 10ip, the buffer pool image 20op, and the lock pool image 20Lp are also operations described in connection with FIG. 2. Further, as seen in FIG. 1A, there is seen an Input path from the Network Processor 50 through the Input message queues 46i over to the Input buffer pool 20ip which subsequently transferred to the DSS 10.

Likewise, on the Output path, a dialog message in the buffer pool 10db of the FIG. 1A, DSS 10, can be conveyed through the Connection Library means 10c, 20c, to the Network Provider via a referenced buffer pool image 20op, plus an attached header from the header pool 20hp for output to a message queue 46o, over to the Network Processor 50.

Referring to FIG. 1B, there is seen a diagram of the PIM/PIE-CLE Connection Library Element interface system and method functioning for the Process Inter-Communication Manager and the Process Inter-Communication Element. The DSS/Application 10 is seen to have an Input Buffer 10ib and an Output Buffer 10db. This (DSS) Unit (10) connects via the Port File 14 (of FIG. 3A) over to the Ports Unit 18. The Ports Unit is seen to have a Lock Pool 18Lp and a specified selected lock 18L. In addition, the Ports Unit 18 has a Connection Library Element designated 18m which represents the Process Inter-Communication Manager—Connection Library Elements and also a unit 18e which represents the Process Inter-Communication Element-Connection Library Element. The Connection Library Element 18m and 18e respectively connect to a PIN CLE 20m and to PIE CLE 20e in the Network Provider 20. As was seen in FIG. 3A, the Network Selector 9 works to designate which particular Network Provider will be fed into the Ports Unit 18.

As was noted, the Process Inter-Communication Manager 18m (PIN) and the Process Inter-Communication Element (PIE) 18e connect respectively Network Provider 20 onto respective Connection Library Elements designated PIN 20m and PIE 20e. The Network Provider 20 also has a access to the Ports Lock Pool 18Lp via its Lock Pool 20Lp and a selected specified Lock Unit designated Lock 20L. The Network Provider 20 also has a header buffer 20hb and a specific selected header unit 20hb. Additionally, the Network Provider 20 has a Buffer Pool 20ip and a Selected Buffer 20ib. The Network Provider connects to the underlying interfaces (as shown in FIG. 2) which are designated 40x.

The Connection Library interface involves an operation whereby a Network Provider 20 can establish its identity with the Network Selector 9 in order to provide interprocess communication services. This interface uses a Connection Library mechanism and has the purpose of providing Network Providers with performance improvements over the priorly used Connection Block (CB) versions of the Process Inter-Communication Manager/process Inter-Communication Element interfaces (PIM/PIE) which introduced undesired amounts of overhead and latency in data transfers.

Thus as seen in FIG. 1B, the PIM/PIE interface involves communication between the Ports Nodule 18 (of the MCP 80) and the Network Providers 20 (NP) for Purposes of improving high speed data communication.

A previously used interface (FIG. 3B) in this architecture involved the Connection Block (CB) mechanisms whereby these CB methods were replaced by a Connection Library program which is used in the improved interface.

In the Connection Library interface, the Ports (18) locks are shared between the MCP 80 and the Network Provider 20 (NP), where a locking convention is adhered to by both the MCP 80 and the Network Provider 20 in order to avoid undesired deadlocks. The locking rules involved here will be described subsequently under the title of "Objects Exported by the MCP Logical I/O."

The architecture has now been arranged that the Network Provider 20 implements the PIE Connection Library in its Support Library. The Master Control Program 80 (MCP) will use the SLed Function Name of a Network Provider's Support Library as the function name for the PIE CL.

The MCP Ports Module 18 can also be used (per FIG. 3B) to continue to support the prior type Connection Block PIM/PIE interface which used the earlier Connection Block technology.

The improved implementation of FIG. 1B now provides methods whereby the Network Provider 20 uses the new Connection Library interface, that is to say, the PIM CLE 18m–20m interface and the PIE Connection Library Elements 18e–20e interface. The PIE Connection Blocks (CB) can also co-exist within the single Network Provider 20. This is to enable support of the earlier Sync-Ports PIE interface which still continues to use the older Connection Blocks (CB) but which may sometimes be required to support some of the older computer systems and networks still in use.

Thus the Network Provider 20 can choose to use either the new Connection Library interface (PIM-CL, PIE-CL) or else fall back upon the priorly used Connection Block (CB) Interface. The Provider 20 may use both the PIE CB and the PIE CL if it is using a PIN CL. If it is using a PIN CB, it may only use the PIE CB. This allows support for Sync_Ports, which are restricted to using the PIE CB.

Most of the "imported" and the "exported" objects for the new Connection Library (CL) interface have been carried over from the prior operations used in the CB interface. All typed procedures return a REAL result in a Request-Result structure format which was particularly defined in a Unisys Corporation Document 50101 entitled "Network Provider Selection for IPC", designated Version F, May 1994.

During its initialization, the Network Provider 20 will link its PIM_CL to that of the MCP 80 by invoking a MCP entry point LINK_ME_TO_DO_CL. This will be discussed hereinafter.

Linking the PIM CLs

The Process Inter-Communication Manager-Connection Library (PIM_CL) shown in Ports 18 on the MCP side (80 FIG. 3A) is a Multi-Connection Library in a "Server" role. The PIM_CL 20m on the Network Provider side 20 (NP), is a single Connection Library acting as a "Client". During its initialization, if it is to provide the PIM/PIE CL interface, the NP 20 links its PIM_CL on to a PIM_CL connection of the MCP 80.

Since READYCL (Ready Connection Library) is not available for connection libraries which have been declared at the D0 level, then the Network Provider 20 cannot initiate the linkage using the regular Link Library in order to enable connection to PIM_CLS. Here instead a direct linkage mechanism is provided to the (NP) Network Provider 20 where there is a particularly indicated MCP entry.

The Network Provider 20 (FIG. 1B) will ready its Connection Library interface PIE_CL during its initialization and also the MCP 80 will link a separate Connection Library Element for each dialog that the Network Selector 9 assigns to the Network Provider 20. A library matching attribute Interface Name for the PIE CL is the PIE name that the Network Provider 20 passes on to the MCP 80 in the Declare_PIE interface.

The PIE CL (Processor Inter-Communication Element-Connection Library) will take over the functions of the earlier used PIE CB (Connection Block) for the Network Providers that support it. Procedures exported by either side of the PIE CL interface have no ANY FAULT blocks. Instead, each side of the interface will export a procedure to handle fault recovery and cleanup.

Subsequently, herein there will be a discussion of the procedures imported and exported through the PIE CL which procedures will be imported by the MCP 80. The export procedures here involve objects exported by the network providers.

Then, likewise, there are objects exported by the Master Control Programs Logical I/O which are imported by the Network Provider via the PIE interface Connection Library.

In summary, for the PIM/PIE-CL interface, there are system software interfaces for the (A) Process Inter-Communication Element Connection Library (PIE CL) and there are system software interfaces for the (B) Process Inter-Communication Manager Connection Library (PIE CL).

In each of these cases (A) and (B), there will be seen to have three elements.

Thus, the Process Inter-Communication Element Connection Library section, item "A" (PIE CL), will provide the following procedures:

A1: Objects exported by Network Providers;
A2: Objects exported by MCP Logical I/O;
A3: Linking PIE_CLs.

Likewise, for section item "B" regarding the Process Inter-Communication Manager-Connection Library (PIM CL), there are basically three sets of procedures involved for this Section B as follows:

B1: Objects exported by Network Providers;
B2: Objects exported by the MCP Logical I/O;
B3: Linking the PIM_CLs.

Section NDPI

The Network Data Path Interface 30 is one of several system software interfaces used in the present high speed data com system. These interfaces are indicated below.

System Software Interfaces (i) The Network Provider (NP) and Network Processor Support (NPS);
(ii) The Network Provider and Physical I/O;
(iii) Physical I/O and the Path Subsystem;
(iv) Network Processor Support and Connection Services;
(v) Connection Services and Network Provider.

As seen in FIG. 1A, the Network Data Path Interface 30 provides operations of the interface between the Network Provider 20 and Physical I/O 40.

Purpose

The purpose of this interface is to manage the initialization and termination of individual inputs and outputs associated with moving message data between the Network Provider 20 and the output Network Processor, 50.

Functions

On the "Input Data Path," the Network Provider 20 is responsible for managing input buffer pools and initializing the input pipes. The Network Processor Support 35 (when used) is responsible for insuring that the input buffers and the associated events are attached and properly marked as "Read" buffers.

Once the input buffers have been initialized, the Network Provider 20 waits for an input indication from the I/O 40. Network Provider 20 is also responsible for maintaining worker stacks to process input indications from the Physical I/O 40. It is assumed that at least one worker stack per input queue is required. Since the Network Provider 20 may process input on the worker stack, more than one worker stack per input queue may be required.

On the "Output Data Path", the Network Provider 20 is responsible for creating all output queues and initializing the output buffers. In systems where Network Processor Support 35 is also implemented, the output buffers are initialized via a "Call" to the Network Processor Support 35. The output is then sent directly to the Physical I/O 40.

Section NPSI

Network Processor Support Interface (35) FIGS. 3A, 3B

Improvements

In order to provide additional performance improvements, this Network Processor Support Interface 35 will make use of the Connection Library (CL) mechanism, seen in FIG. 5.

The Network Processor Support 35, when utilized in the system, can also continue to support the CB (Connection Block) Network Provider Interface for Network Providers which do not use the new Connection Library (CL) Interface as indicated in FIG. 3B. Also, Network Providers can support the prior type of Connection Block Interface in case the utilized system version of the Network Processor Support (35) does not support the new interface.

Initialization and Termination

The Connection Library (CL) between any given Network Provider 20 and NP Support 35 contains one Connection Library Element (CLE) per device. All pipes between the given Network Provider and a given device will use the same Connection Library Element (CLE). The pipe "id" is passed on to the Network Processor Support 35 via the Initialize_Pipe instruction.

The CLE is connected to Network Processor Support 35 via the INTERFACENAME attribute in the Link Library. This INTERFACENAME is based on the ICP/CA unit number. For example, INTERFACENAME="NP_ ←UNITNUMBER→.".

NP Support Approval Procedure

The Network Processor Support 35 initializes all procedure references based on whether or not the ICP/CA (Integrated Communication Processor/Channel Adapter) supports multiple pipes. This approval procedure is only invoked during initiation of the CLE (Connection Library Element).

Network Provider Change

The Network Provider's change procedure is used to insure proper termination when the Network Processor Support goes away. The Network Provider is responsible for cleaning all of the "Area 1" buffers attached to the device being terminated. These buffers must then be marked as "free" for use by other devices but cannot actually be used until another Attached_Buffers_and_Events operation is done to associate them with a new device. "Area 1" buffers represent the first buffer in a multi-area I/O.

Network Processor Support Change Procedure

The Network Processor Support 35 change procedure is to insure proper termination when the Network Provider 20 goes away. When the change procedure is invoked with a state of "delinked", the Network Processor Support 35 informs the Path Subsystem 50 with the ENDP commands on the output queue. This informs the Path Subsystem that there are no more GETs outstanding for the pipes initialized via the Connection Library (CL). The Network Provider 20 will then wait for outstanding I/Os to complete. All outstanding GETs will be completed by returning a "dummy message" as handled in the Path Subsystem–NP Network Processor Support Interface.

DELINK LIBRARY

The Network Provider 20 performs an explicit Delink Library to initiate termination of the CLE. Both the Network Provider and the Network Processor Support are informed of a delink via appropriate change procedures.

Interface Function

The earlier used Connection Block (CB) units ($20pu$, $35pu$, FIG. 6) between the Network Provider and the Network Processor Support provides: (i) initialization of the input pipe; (ii) initialization for the Input/Output data buffers to be used for both Physical I/O Reads and Writes, for both the Gather and the Non-Gather Systems; (iii) termination of data buffers; (iv) I/O error handling and simulation of multiple pipes for systems that do not support them.

Network Processor Support Initialize Pipe

This is a procedure which is exported from the Network Processor Support Connection Library 30 (FIG. 3B) and is called by the Network Provider 20. This procedure is called by the Network Provider 20, once the Linked Library has completed successfully. It passes the pipe "id" so that the Network Processor Support 35 can send the PIPE command to the Path Subsystem 54 on the Network Processor 50. The Network Processor Support 35 does not wait to handle errors in the new interface 30 while it did do so in the old interface $20b$ on the I/O in the new interface 30, the Network provider 20 waits and then handles errors. The pipe "ids" owned by each Network Provider are static (per DAS 22, FIG. 3A) and are unique to the entire system, that is, they cannot be shared across Providers.

Section CSI

There are a number of significant features which are provided by the system's Cooperative Service Interface 12, FIG. 2. These features include the elimination (Seen in FIG. 3A) of a Port I/F (Logical I/O 14) and ports 18 which would normally be required for the DSS's data path. The Network Selector Module 9 need not be used when the Cooperative System Service Interface 12 is used. The buffer sharing between the Network Provider 20 and the DSS 10 will be seen to (i) eliminate data copies, and (ii) eliminate call-back procedures. The arrangement for lock-sharing between the Network Provider 20 and the DSS 10 will be seen to (a) simplify the locking procedures, and (b) eliminate the lock-related timing holes. Further, the interface between the DSS 10 and the Network Selector Module 9 (FIG. 3A) also work for enhancement of supporting the Cooperative Interface. The Cooperative Service Interface 12 presents certain advantages over its predecessors which previously involved a synchronized port interface which used Connection Blocks (CBs); and now the new Cooperative Service Interface 12 now uses a CL-oriented interface, providing a CL-oriented (Connection Library) interface which allows the elimination of the Logical I/O port, but also now allows buffer sharing.

The Cooperative Service Interface 12 has certain key features of enhancement which involve (i) the locking strategy whereby dialog locks will be shared between the DSS 10 and a Network Provider 20. Further, (ii) the use of buffer-sharing whereby ownership of the Network Provider input buffers is logically transferred to the DSS 10 when the DSS 10 chooses to retain a buffer delivered to the DSS 10. The ownership of the DSS 10's output buffers is logically transferred to the Network Provider 20 for transmission when the output is requested. As a result, much data-copying is eliminated.

The ownership of buffers shared in this way is later returned to their original owner when the borrower is finished with them.

Referring to FIG. 2, there is seen a drawing of the utilization of the Cooperative Services Interface 12 by means of showing two main channels of the data flow, that is to say, the "output path," and other path being the "Input Path." Here in FIG. 2, there is seen the DSS 10 having an outgoing buffer pool $10_{op}$, a lock pool $10_{Lp}$, and an image of the input buffer pools, $10_{ip}$, which consist of pointers to the actual pool, $20_{ip}$ in the Network Provider 20.

In communication with the DSS 10, is the Network Provider 20, which is seen to have an input buffer pool $20_{ip}$, and where there occurs an image in buffer pool $10_{ip}$ (involving pointers of buffer pool $20_{ip}$ from the DSS's perspective). Additionally, the Network Provider 20 has an image lock pool $20_{Lp}$ which receives pointers from the actual lock pools $10_{Lp}$ and via a Connection Library element, $11c$, from the lock pool $10_{Lp}$.

The Network Provider 20 will be seen to have a set of buffer pool image pointers designated $20_{op}$, which are received from the buffer pool $10_{op}$. Likewise, an Issue Buffer Send Command is sent to the header pool $20hp$ to build the protocol header in $20_{hb}$.

In the Network Provider 20, there are other paths for carrying messages from other DSSs as seen on bus $22m$, and further, there is a connection $21n$ for inserting headers and buffer information in a PIO (Physical I/O) queue of the Physical I/O 40.

The Physical I/O 40 is a function of the Master Control Program 80 (MCP), where it is seen that "outgoing" messages are placed on the message queue $46_o$, then transferred to the I/O storage unit 47 in order to build a header $48h$, and the Write buffers 48, which are sent on bus $50b$ to the Network Processor 50. The message-queues $46_o$ and $46_a$ are actually multiple in number and constitute 16 Input queues designated via dotted lines $46_i$–16, and one Output queue $46_o$.

Similarly, the Physical I/O 40 will be seen to have an "input" Read Request block 42, which is connected to the unit 43 in order to store messages onto the message queues $46_i$ and also to send information (message Complete) on bus 45 to the buffer pools $20_{ip}$, and specifically for example, to a selected buffer $20_{ib}$.

Data flows are shared according to the lines headed by arrows shown in FIG. 2. The buffer pool $10_{op}$ in FIG. 2, is the output buffer pool which is owned by the DSS 10 (shown in solid lines), and is exported to the Network Provider 20 where its imported image of pointers is shown as buffer pool (pointers) $20_{op}$.

Similarly, there is shown the owners and imported images of other shared data items, such as the dialog lock pool $10_{LP}$ owned by the DSS 10, which is exported to the Network Provider 20. The "input buffer" pool $20_{ip}$ owned by the Network Provider 20 is exported to the DSS 10, where it is consumed by the DSS which writes it to disk if it is transferring a file. The DSS 10 also can put the information in a mail box if it is receiving mail.

One output unit message queue $46_o$ is shown accepting output messages from "other" DSS's on bus $22m$.

In FIG. 2, there is seen one input unit 43, however, there may be multiple independent input units 43, in addition.

As seen in FIG. 2, the input path may operate into a single Channel Adapter 50 having a single receiving unit $50_i$, which feeds input data into the Read Request buffer 42, which is fed to the receiving unit 43 and then to message queues $46_{i\text{-}16}$. When the buffer pools, $20_{ip}$, of Network Provider 20 issue the buffer Read command to the message queue $46_i$, then the unit 43 will transmit to the buffer pool $20_{ip}$, and thence to the image buffer pools and pointers $10_{ip}$ of the DSS 10.

The interfaces between the DSS 10 (or other DSS's), and the Network Provider 20 is basically indicated in FIG. 2. These can be designated as system software interfaces.

The purpose of these system software interfaces is to manage the initialization and termination of dialogs between the DSSs 10 and remote end points, and the flow of input and output data over these dialogs.

The functions of these system software interfaces involve (a) initialization and termination, (b) utilization of the input data path, and (c) utilization of the output data path.

The Network Provider 20 is responsible for validating attributes from the DSS 10, and if no error is detected, the "Open Sequence" is initiated. The "Open Sequence" is a protocol-dependent exchange of messages which establishes a dialog. The Network Provider 20 notifies the DSS 10 when the "Open Sequence" has been completed, and when the remote side has initiated or completed termination. The Network Provider 20 must continue to handle both passive and active "opens", and the orderly and immediate "closes" (close abort).

On the "Input" path interface of FIG. 2, the Network Provider 20 is responsible for passing received data to the DSS 10 and providing the DSS the opportunity to retain the data for subsequent retrieval. If the DSS retains the data, the DSS 10 is then considered to be the "owner" of that buffer, and is responsible for notifying the Network Provider 20 when the buffer is available for re-use.

On the "Output" data path interface, the Network Provider 20 is responsible for forwarding the buffer's data, passed to it by the DSS 10, over to the physical I/O 40, after attaching the appropriate headers. The Network Provider 20 is also responsible for notifying the DSS 10 when the buffer's data becomes available. Further, the Network Provider 20 is responsible for notifying the DSS 10 when outbound flow control is entered and is exited.

In regard to FIG. 2, in earlier implementations, a DSS would use the buffer pool 10, and the DSS would indicate that it needs to send a message to the service on another machine, so that the DSS would call the Network Provider 20. Then the Network Provider 20 would copy the data again, and the Network Provider 20 would now have his own copy of the data from the buffer pool $10_{op}$. Then the Network Provider 20 would send the data down to be copied by the Physical I/O 40 through the queue $46_o$, and the data would get copied into the memory of the Channel Adapter 50 (FIG. 2).

Now in the present system, the DSS 10 builds the data directly into the buffer pool 10op. However, since the system is now sharing the references to this buffer pool $10_{op}$, it is not necessary to copy it over to the Network Provider 20. What happens here is that the Network Provider 20 builds a header in header pool $20_{hp}$, which will be useful for sending or transmitting the data in $10_{hp}$ to the DSS 10 or another machine. The Network Provider 20 uses the image pool $20_{op}$ of the buffer pool $10_{op}$ which involves a selection of pointers.

Under the earlier methodology, the User would have some data, and would call the DSS 10 to send the data to a buffer pool in the Network Provider 20, plus a header pool to describe what was going to happen to the data. Then the User would say he needs to send that information and would call the Network Provider 20, which would operate to say "I put my own header material on the front, and then behind this I have the messages from the DSS 10, and I will pass this down another level to the Physical I/O 40 to be sent to the Channel Adapter." Thus, what was done was to copy the User data into the DSS buffer, and then "again copy" the User data and the DSS data into the Network Provider buffer, (in the Network Provider 20). Then the entire message data and header package would be sent out to the I/O 40 and the Channel Adapter in 50.

Quite contrarily, under the presently described system, the real buffer 10 of the DSS 10 is then placed as an image pointer in the Network Provider 20. This image is merely just a reference into the memory of the DSS 10.

So what was done was to copy the User's data into the DSS's buffer $10_{op}$, and still put the DSS's header on the front of it, but now, under the present system, it is not necessary to copy this data into the Network Provider 20. The image buffer pointer pool $20_{op}$ of the Network Provider 20 is not a copy of the data, but is merely a reference unit using pointers, which involves functions similar to that of a pointer looking into another module's memory. So a considerable savings is initiated since it is much faster, in that it is not necessary to "copy" the data, but merely to set up a reference pointer to a memory.

What is still utilized here, is the Network Provider's header pool $20_{hp}$, and then using the "Gather" operation where it is possible to concentrate and pass the two buffers ($10_{db}$ and $20_{hp}$) collectively, i.e. first one, and then the second, on just one request, so no data was necessary to be copied. So now the present operation copies the data out of the User's buffer, but is not required to copy the DSS's data, or copy the DSS's copy of the User's data.

This data still sits in a section of memory and it gets sent out on the wire, and when the "send" is finished, it tells the DSS 10 that the transmission was completed.

The data in memory remains in the DSS buffer pool $10_{op}$, so that there is the concept of "buffer sharing" which is operating in the outward path direction. Likewise, this is also done in the inward, or input path direction.

Thus, the module which owns the buffer, for example, the Network Provider owning the buffer pool $20_{ip}$, passes the reference pointers to $10_{ip}$, of the DSS 10 and it does not have to copy the data and pass it on.

So rather than copying, for example, on the input path channel, it is only necessary to get in the "message" which has three parts to it; (i) the Network Provider portion 20 on the front, then (ii) the DSS 10 part in the middle, and then (iii) the "User" part on the end. Thus, rather than copying (which formerly had to be done), it is just now necessary to copy this particular part into the buffer $20_{ip}$, which would then be copied into the User's Buffer by utilization of the image pointers or buffer pools $10_{ip}$. These pointers are a view pointing to the memory, so that the DSS 10 has a view of the memory that belongs to the Network Provider 20.

Then the Network Provider 20 sends the pointers which access the memory for transmission to the User buffer.

So what is actually being done is to tell the DSS 10 where the dialog message information is located in the buffer, $20_{ip}$ of the Network Provider 20.

The Cooperative Service Interface 12 involves a series of line interactions. It involves the "projection" of the two buffer pools $10_{op}$ and $20_{ip}$ from one environment into the other, using a set of pointers which are in the interface, these image pointers being $20_{op}$ and $10_{ip}$.

It may be noted there is a similar set of image pointers for the lock pool $20_{Lp}$ which operates for coordination to make sure that two requesters are not trying to access the same memory location at the same time.

The Cooperative Service Interface 12 provides an additional performance over the earlier types of Sync_Ports by allowing a Network Provider and a DSS to bypass the Port File code in the Master Control Program (MCP), by allowing it to share data and by relaxing the rules about what can be performed as part of an input notification.

Section G

Figure 4:
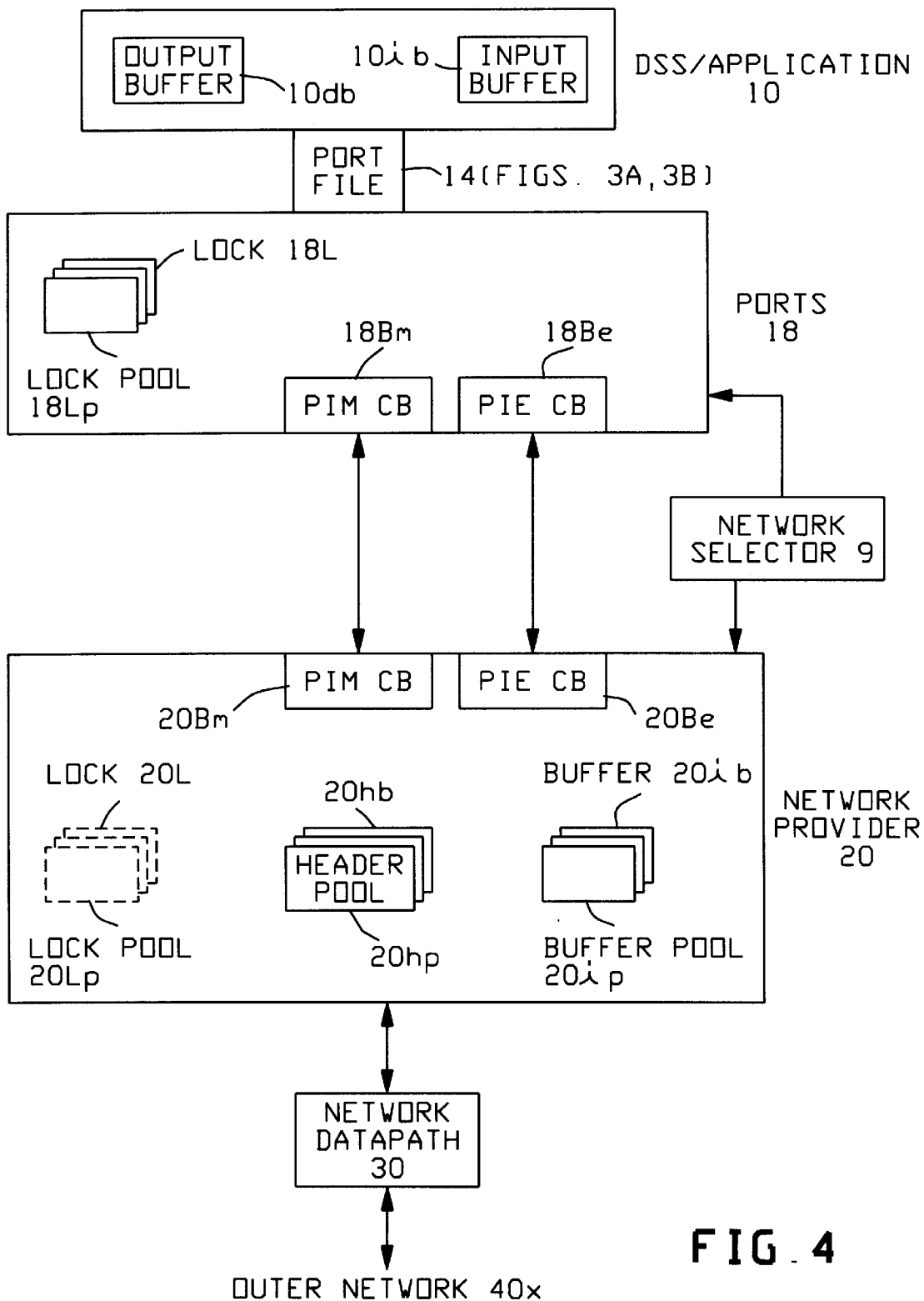
FIG. 4 is a drawing of an earlier Master Control Program-–Ports Interface with a Network Provider which involved Connection Blocks (CB) which were burdened with high overhead, undesired latencies and multiple lock pools.

The interface between the MCP's Port File code and the Network Providers was previously implemented as an old-style Connection Block (CB), such as seen in FIG. 4. By changing this implementation to a Connection Library (CL), as in FIG. 5, this provided a performance advantage by eliminating the MCP overhead required to access entry points exported via a Connection Block (CB). Because Connection Libraries can export data items in addition to procedures, this change also allows for Port File code and the Network Providers to "share" dialog-oriented locks. Such sharing allows elimination of the elaborate lock-deadlock avoidance code previously employed and is now permitted to be simplified greatly, thereby not only improving performance, but also closing numerous timing windows. Sharing locks this way also obviates the need for several of the more complex interfaces previously required.

The E-mode-based portions of Network Providers currently communicate with their Network Processor components via an interface provided by Network Processor Support 35. The Network Processor Support 35 was used in earlier implementations to provide (FIG. 6) a complex path CB (Connection Block) interface which Network Providers use to get the data they wish to send into a I/O capable buffer, and the Network Processor Support 35 generates and parses the Queue Service Provider (QSP) protocol in order to multiplex the numerous dialogs the Network Providers have, over a single physical unit queue.

In the improved architecture, multiple queues are provided between the E-mode environment, and a given Channel Adapter environment, obviating the need for the earlier multiplexing function, and eliminating the demultiplexing bottleneck on the Network Processor/Controller stack on the input. Since the QSP protocol generation is very simple, that function has been moved into the Network Providers. This redistribution of function allows the Network Processor Support 35 to be eliminated from the data path.

To avoid the necessity of copying data in order to assemble Network Provider-generated header data, and data from multiple-user buffers into one contiguous memory area, the ability to Gather data from multiple buffers on "output" is added to the I/O processor in the I/O 40. The physical I/O simulates Gather in cases where the I/O processor does not support it directly.

In addition, a Scatter feature is provided, so that a single incoming data message can be split across multiple buffers. This is used by the Network Providers to ease their memory management problems; they have consolation code to cope with cases where Scatter is not provided by the I/O processor.

Data and State Sharing

The buffer pool 10op shown in FIG. 2 is the output buffer pool which is owned by the DSS 10, and is exported to the Network Provider 20 where its imported image is shown with the dashed lines as 20op, which holds pointers.

Similarly, the same solid and dashed lines are used to show the "owners" and the imported images of other shared data items. The dialog lock pool $10_{LP}$ is owned by the DSS 10, and image buffer pool 10ip is used for holding pointers for export to the Network Provider 20. Likewise in FIG. 2, the input buffer pool 20ip, which is owned by the Network Provider 20, provides data exported to the DSS 10.

One output unit message queue is shown accepting output messages from "other" DSS's on line 22m. The diagram in FIG. 2 shows multiple input unit queues, $46_{i-16}$. In actual implementation, there can be multiple independent input unit queues, up to 16 for example.

The purpose of the Cooperative Service Interface 12 is to manage the initialization and termination of dialogs between DSS's and remote end points, and manage the flow of input and output data over those dialogs.

Initialization and Termination

The Network Provider 20 is responsible for validating attributes from the DSS 10, and if no error is detected, an "Open Sequence" is initiated. The Network Provider 20 notifies the DSS 10 when the Open Sequence has completed, and also when the remote side has initiated or completed termination. Network Providers must continue to handle both passive and active "opens", and orderly and immediate closes.

Input Data Path

On the input data path of FIG. 2, the Network Provider 20 is responsible for passing received data to the DSS 10 and providing the DSS the opportunity to "retain" the data for subsequent retrieval. If the DSS retains the data, the DSS 10 is then considered to the "owner" of that buffer, and is responsible for notifying the Network Provider when the buffer is available for re-use (de-allocation).

Output Data Path

On the output path of FIG. 2, the Network Provider 20 is responsible for forwarding the buffers passed to it by the DSS 10 over to the Physical I/O 40 after attaching the appropriate headers from the header pool 20hp. The Network Provider 20 is also responsible for notifying the DSS 10 when buffers become available. Additionally, the Network Provider 20 is responsible for notifying the DSS 10 when outbound flow control is entered and exited.

Architecture

In order to provide additional performance requirements, the Cooperative Service Interface 12 will make use of the Connection Library mechanism, shown in FIGS. 2 and 5. Linkage is initiated by the DSS 10. This interface will not be operative before a Network Provider 20 has been established with Network Processor Support 35, and may be terminated unexpectedly if the Network Processor Support changes versions while the Network Provider 20 is running. A single Connection Library may support multiple dialogs. Thus in FIG. 5, the DSS 10 has a Connection Library 10c and the Network Provider 20 has a Connection Library 20c.

Section CLD

DSS Connection Library Data Items

These data items are exported by the DSS Connection Library (CL) 10c, FIG. 5, and imported by Network Provider Connection Library (CL) $20_c$, FIG. 5.

The buffer pool loop in FIG. 2 is used for DSS-initiated outbound data requests. A reference to the same buffer may be passed on to the Network Provider 20 for more than one dialog at a time. It may also be passed to more than one Network Provider at a time. As such, the Network Provider 20 may not write into the buffer. If this kind of sharing across dialogs and Network Providers is done, the DSS 10 must ensure that the "same lock" is used for all dialogs to which the buffer reference may be passed. This for example, in FIG. 2, could be a selected lock such as $10_{dL}$ in the lock pool $10_{LP}$.

In FIG. 2, the shared lock pool is designated $10_{LP}$ and is used for guarding the "state" related to dialogs implemented over this instance of the Cooperative Service Interface 12. When calling imported Network Provider procedures, the DSS will be "holding" the shared dialog lock. The Network Provider 20 may not release the lock before returning from the call. When the Network Provider 20 calls one of the exported DSS procedures, it must do so while holding the dialog lock. The DSS 10 may not release the lock before returning from the call.

To avoid deadlocks, both the DSS 10 and the Network Provider 20 must enforce consistent lock-ordering rules regarding locks which are held at the same time as the dialog lock. In addition, if either entity needs to hold two or more dialog locks simultaneously, it must grab the one with the lowest lock number first.

In FIG. 2, the buffer pool 20*ip* is the buffer pool which contains inbound requests. The DSS 10 may not Write into the Network Provider's buffer pool 20*ip*.

Initialization, Termination, Other Administration Interface Items

The Connection Library $10_c$ of FIG. 5 between the Network Provider 20 and the DSS 10 provides support for dialog initiation and for termination for the DSS 10. It also provides a mechanism whereby the DSS 10 and the Network Provider 20 can exchange information global to all dialogs associated with this connection library, such as the IDS of the buffer pools that will be used for input and output.

There is no automatic mechanism for returning buffers to their declarers. This must be done by the DSS 10 and the Network Provider 20. It is the responsibility of the DSS 10 to return all Network Provider buffers retained by the DSS. Similarly, it is the responsibility of the Network Provider 20 to return all DSS buffers passed to the Network Provider for transmission over the network. Buffers are to be returned as soon as convenient, but there is no requirement that buffers be returned before the dialog, that they are associated with, terminates.

Sect. CLD-I: Input Path Functions for Network Data Path

Interface 30

The following functions are provided in the interfaces on the "Input Data Path": (FIGS. 2, 3B).

(if1) Network Processor 50 to Network Processor Support 35: (Channel Adapter/Integrated Communications Processor-Network Processor Support).
  (a) Support of multiple pipes.
  (b) Simulation of multiple pipes on systems which do not support multiple pipes.
(if2) Network Provider 20 to Physical I/O 40:
  (a) Network Provider waits for input from Physical I/O.
(if3) Network Processor Support 35 to Network Provider 20:
  (a) Initializes and terminates input pipes/queues.
  (b) Network Provider manages input buffer pools.
  (c) Network Provider initializes buffers via NP Support.

Sect. CLD-O Output Data Path Functionality for Network Data Path 30 (FIGS. 2, 3B)

(of1) Network Processor Support 35 to CA/ICP, 50:
  (a) Support of Gather.
  (b) Simulation of Gather on systems which do not support Gather.
(of2) Network Provider 20 to Network Processor Support, 35:
  (a) Network Provider initiates output request to Physical I/O.
  (b) Physical I/O returns exception result to the Network Provider.

Section PNDP

Figure 6:
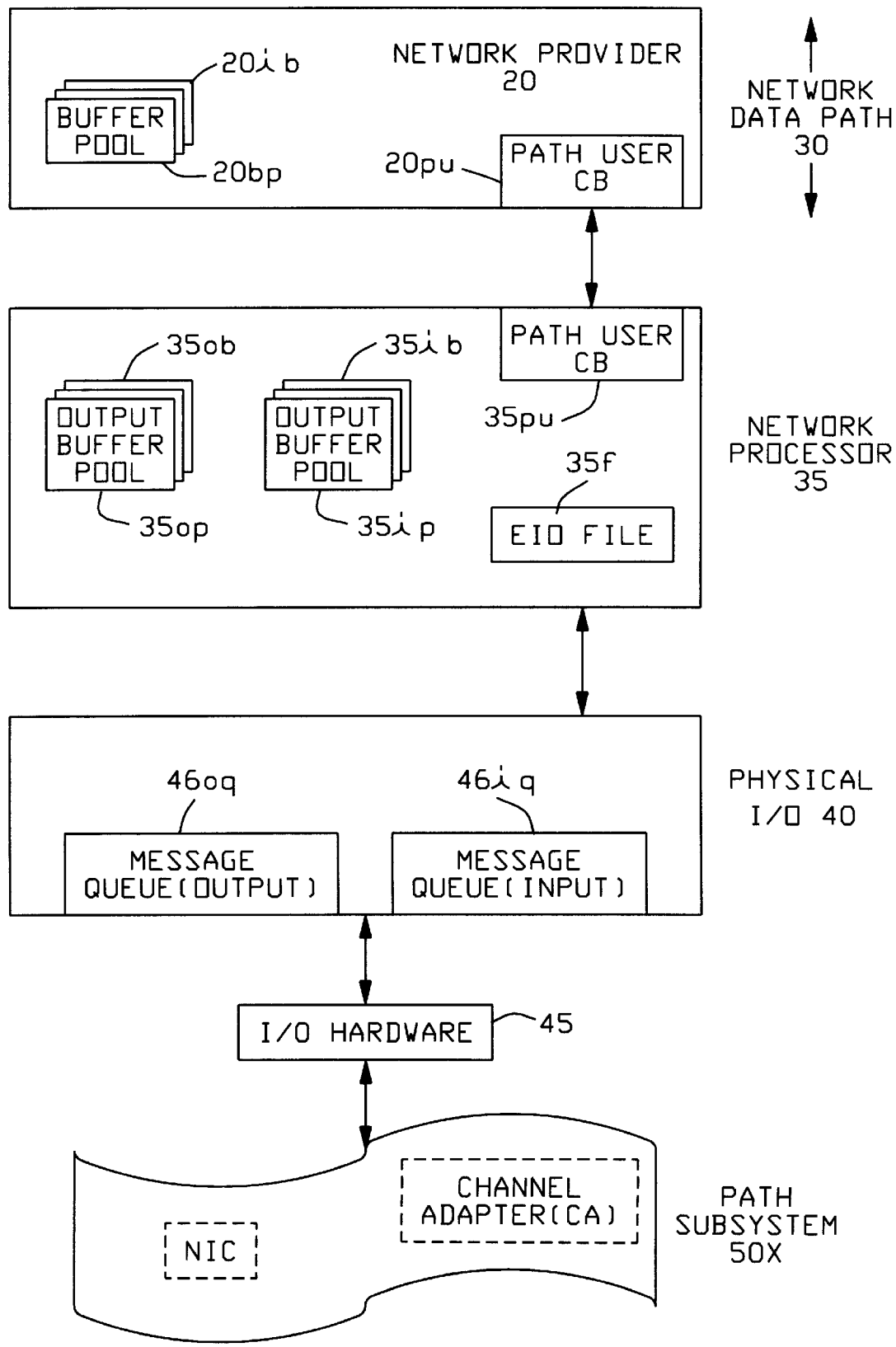
FIG. 6 is a drawing of an earlier implementation of the Network Data Path Interface integrated to work with the Network Processor Support (NPS 35).

Now referring to FIG. 6, there is shown a diagram of the prior earlier-used Network Data Path implementation with Connection Blocks. These interfaces required considerable extra overhead and undesirable latencies in operations.

The prior Connection Block Network Data Path architecture of FIG. 6 shows the Network Data Path Interface 30 having a Network Provider 20 with a buffer pool 20*bp* which utilizes a selected buffer 20*ib* for a particular dialog message. This message can be input or output via the Path User Connection Block (CB) 20*pu*, which communicates with the Connection Block 35*pu* of the Network Processor Support 35.

The Network Processor Support 35 provides an output buffer pool 35*op* which has a selected buffer 35*ob* for a particular dialog message. The input buffer pool 35*ip* utilizes a selected buffer 35*ib* for particular input dialog message data. A file 35*f* designated as EIO file communicates with the I/O 40 having an Output Message Queue 46*oq* and Input Message Queue 46*iq*.

I/O Hardware 45 transports data between I/O 40 and the Path Subsystem 50*x* which can include Network Processors, ICPs, Integrated Communications Processors, Channel Adapters, CA's, or other peripheral modules as seen in FIG. 3B where the Network Processor 50 shows the ICP environment.

The following sections designated "Section PCB" and "Section PCL" will illustrate the sequential operational functions and difference between the prior PIM/PIE Connection Block Interface (Section PCB) and the improved PIM/PIE Connection Library Interface (Section PCL).

Section PCB: Prior Implementation

Prior PIM/PIE CB interface; Functional Elements: (Refer to FIG. 4):

PCB 1. Dialog Setup initiation
PCB 2. Dialog Setup completion
PCB 3. Sending Data
PCB 4. Resending Data
PCB 5. Receiving Data
PCB 6. Delayed processing of data
PCB 1: Dialog Setup—Initiation
  1. Application initiates "Open" action, calls Ports 18, via file 10*f* in DSS 10.
  2. Ports 18 allocates a lock 18L from lock pool 18Lp, to use to protect the dialog state.
  3. Ports grabs its dialog lock 18L.
  4. Network Selector 9 determines which Network Provider to use.
  5. Ports 18 drops it dialog lock 18L.
  6. Ports calls the Network Provider 20 via PIM CB 10B*m* and asks it to establish a dialog.
  7. Network Provider 20 allocates a lock 20L from lock pool 20L for its side of the dialog and allocates a dialog state.
  8. Network Provider 20 grabs its lock 20L.
  9. Network Provider 20 validates the request.
  10. Network Provider 20 takes protocol-specific action to begin dialog initiation. (This involves sending data out on the network via the underlying interface 40*x*).
  11. Network Provider drops its lock 20L.
  12. Network Provider returns to Ports 18.
  13. Ports 18 grabs its dialog lock 18L.
  14. Ports adjusts its state information.
  15. Ports 18 drops lock 18L.
  16. Ports waits to be notified that dialog has been initiated.
PCB 2: Dialog Setup—Completion 1. Network Provider 20 receives input data from the network 40x.
2. Network Provider looks at data and decides which dialog it is related to.
3. Network Provider grabs lock 20L.
4. From data, Network Provider determines that it has completed its protocol sequence and the dialog is established.
5. Network Provider 20 completes its dialog table.
6. Network Provider calls Ports 18 via PIM CB 20Bm to inform it.
7. Ports 18 grabs lock 18L.
8. Ports links the PIE CB 18Be to the Network Provider 20.
9. Ports 18 updates its dialog state.
10. Ports signals user that dialog is now Open.
11. Ports 18 drops its lock 18L.
12. Ports returns to Network Provider 20.
13. Network Provider drops its lock 20L.

PCB 3: Sending Data
1. Application 10 fills a buffer 10db with a message it wants to send.
2. Application calls WRITE referencing the file 10f and the output buffer 10db.
3. Ports 18 grabs its dialog lock 18L.
4. Ports verifies that dialog state allows sending.
5. Ports drops its lock 18L.
6. Ports 18 calls Network Provider 20 via PIE CB 18e.
7. Network Provider 20 grabs its lock 20L.
8. Network Provider allocates a buffer 20ib from buffer pool 20ip.
9. Network Provider 20 builds a protocol header 20hb in the front of the buffer 20ib.
10. Network Provider copies the Application's data from the Application's buffer 10db into the Network Provider's buffer 20ib (after the header).
11. Network Provider calls underlying interface to send the data out on the network, via 40x.
12. Network Provider drops its lock 20L.
13. Network Provider returns to Ports 18.
14. Ports grabs its lock 18L.
15. Ports adjusts its state information.
16. Ports drops its lock 18L.
17. Ports returns to Application 10.
18. Application 10 may now reuse its buffer 10db.

PCB 4: Resending Data
1. Network Provider 20 determines that data has not arrived at its remote destination.
2. Network Provider grabs the dialog lock via 20L.
3. Network Provider reuses buffer 20ib built in the sending data step to send the data over the network another time.
4. Network Provider 20 drops its dialog lock.

PCB 5: Receiving Data
1. Network Provider 20 receives data from network 40x via underlying interface.
2. Network Provider determines which dialog the data belongs to.
3. Network Provider grabs the dialog lock 20L.
4. Network Provider adjusts to its dialog state.
5. Network Provider 20 calls in Ports 18 via PIE_CB 20Be.
6. Ports grabs its lock 18L.
7. Ports saves a reference to the data for later processing.
8. Ports adjusts its dialog state.
9. Ports signals the user that data is available.
10. Ports drops its lock 18L.
11. Ports returns to Network Provider 20.
12. Network Provider 20 drops the lock 20L.

PCB 6: Delayed Processing of Data
1. Application 10 calls READ via the Port File 10f referencing an application buffer 10ib.
2. Ports 18 grabs its lock 18L.
3. Ports 18 validates that dialog is active.
4. Ports drops its lock 18L.
5. Ports calls in Network Provider 20 via PIE_CB 20Be.
6. Network Provider grabs its lock 20L.
7. Network Provider 20 locates the data the application is requesting and copies it into the application's buffer 10ib in DSS/Application 10.
8. Network Provider drops its lock 20L.
9. Network Provider 20 returns to Ports 18.
10. Ports grabs its lock 18L.
11. Ports adjusts its dialog state.
12. Ports 18 drops its lock 18L.
13. Ports returns to the Application 10.
14. The Application 10 processes the data.

Section PCL
New PIM/PIE CL interface; Functional Elements
PCL1. Dialog Setup initiation
PCL2. Dialog Setup completion
PCL3. Sending Data
PCL 4. Resending Data
PCL 5. Receiving Data
PCL 6. Delayed processing of data PCL 1: Dialog Setup—Initiation
1. Application initiates "Open" action, calls Ports 18 via file 14 in DSS 10.
2. Ports 18 allocates a lock 20L from lock pool 20Lp, in Network Provider 20, to use to protect the dialog state.
3. Ports grabs its dialog lock 20L.
4. Network Selector determines which Network Provider to use.
5. Ports 18 calls the Network Provider 20 via PIM CLE, 20m and asks it to establish a dialog and to associate lock 20L with this dialog.
6. Network Provider 20 allocates a dialog state.
7. Network Provider validates the request.
8. Network Provider takes protocol-specific action to begin dialog initiation. (This involves sending data out on the network via the underlying interface 40x).
9. Network provider returns to Ports 18.
10. Ports 18 drops lock 20L.
11. Ports waits to be notified that dialog has been initiated.

PCL 2: Dialog Setup—Completion
1. Network Provider 20 receives input data from the network.
2. Network Provider looks at data and decides which dialog it is related to.
3. Network Provider grabs lock 18L in Ports via its reference 20L in NP 20.

4. From data, Network Provider determines that it has completed its protocol sequence and the dialog is established.
5. Network Provider completes its dialog state.
6. Network Provider calls Ports 18 via PIM CLE 20*m* to inform it.
7. Ports links the PIE CLE 18*e* to the Network Provider's PIE CLE 20*e*.
8. Ports updates its dialog state.
9. Ports signals user that dialog is now Open.
10. Ports returns to Network Provider 20.
11. Network Provider drops the lock via reference 20L.

PCL 3: Sending Data
1. Application 10 fills a buffer 10*db* with a message it wants to send.
2. Application calls WRITE referencing the file 14 and the buffer 10*db*.
3. Ports 18 grabs its dialog lock 18L.
4. Ports verifies that dialog state allows sending.
5. Ports calls Network Provider via PIE CLE 20*e*.
6. Network Provider allocates a buffer 20*ib* from buffer pool 20*ip*.
7. Network Provider builds a protocol header in the front of the buffer 20*ib*.
8. Network provider copies the Application's data from the Application's buffer 10*db* into the Network Provider's buffer 20*ib* (after the header).
9. Network Provider calls underlying interface to send the data out on the network.
10. Network Provider returns to Ports 18.
11. Ports adjusts its state information.
12. Ports drops its lock 18L.
13. Ports returns to Application 10.
14. Application may now reuse its buffer 10*db*.

PCL 4: Resending Data
1. Network Provider 20 determines that data has not arrived at its remote destination.
2. Network Provider grabs the dialog lock via reference 20L.
3. Network Provider reuses buffer 20*ib* built in the sending data step to send the data over the network another time.
4. Network Provider drops the dialog lock via reference 20L.

PCL 5: Receiving Data
1. Network Provider 20 receives data from network via underlying interface 40*x*.
2. Network Provider determines which dialog the data belongs to.
3. Network Provider grabs the dialog lock 18L via its reference 20L.
4. Network Provider adjusts to its dialog state.
5. Network Provider 20 calls in Ports 18 via PIE_CLE 20*e*.
6. Ports saves a reference to the data for later processing.
7. Ports 18 signals the Application 10 that the data is available.
8. Ports adjusts its dialog state.
9. Ports 18 returns to Network Provider 20.
10. Network Provider 20 drops the lock 18L.

PCL 6: Delayed Processing of Data
1. Application 10 calls READ via the Port File 14 referencing an application buffer 10*ib* in DSS 10.
2. Ports 18 grabs its lock 18L.
3. Ports 18 validates that dialog is active.
4. Ports calls in Network Provider 20 via PIE_CLE 20*e*.
5. Network Provider 20 locates the data the application is requesting and copies it into the application's buffer 10*ib* in DSS 10.
6. Network Provider 20 returns to Ports 18.
7. Ports adjusts its dialog state.
8. Ports drops its lock 18L.
9. Ports returns to the Application 10.
10. The Application 10 processes the data.

Disclosed herein has been an improved method and system of multiple interfaces for high speed data com operations.

The described method and system coordinates the use of a Cooperative Services Interface, a Network Data Path Interface and a PIM/PIE Connection Library Interface which permits buffer and lock pool sharing and more efficient connection interfaces which reduce software overhead operations and speed data transfers by reducing latency between the NCP Ports unit and a Network Provider which introduces Connection Library Interface Elements between the MCP's Port unit and the Network Provider which enables more efficient methods of data transfer between a Distributed System Service/Application unit and Network Provider for instituting faster data transmission to and from external interfaces.

Attached herein is an Appendix I having sections I–A, I–B and I–C which indicate special procedures for the Connection Library Interfaces which involve the following:

I–A: Port Locks.
I–B: Linking the PIM_CLs: MCP Entry Point.
I–C: Declare PIE.

Although a preferred implementation of the invention has been described herein, it should be understood that the invention is defined in the following claims:

Appendix I–A

PORT_LOCKS: The MCP exports this data structure to the NP to support the new lock sharing scheme between the MCP and the Network Provider. The port_lock_index parameter passed to the NP procedures Initiate_Dialog and Request_Dialog_Evaluation is used to index into this Port_Locks array in order to obtain the interlock used for the dialog.

ALGOL Declaration:
INTERLOCK ARRAY REFERENCE PORT_LOCKS [0];

The locking rules for the new shared lock paradigm are as follows:
The locking rules for the new shared lock paradigm are as follows:
1) When calling PIM/PIE CL procedures imported from the Network Provider, the NCP Logical I/O will not drop the shared port lock, and the Network Provider must NEVER relinquish it either before returning from the call.
2) When the Network Provider calls one of the PIM CL procedures exported by Logical I/O it must do so holding the required port lock(s).
3) If the Network Provider needs to hold more than one port lock simultaneously, it must grab them in numerical order (lower lock numbers before higher lock numbers.)

4) To avoid deadlocks, both the MCP and the Network Provider mush enforce consistent lock ordering rules regarding locks which are held at the same time as the port lock.
5) The shared port lock must be held while the PIE CL is being linked and delinked. However, it is not possible to guarantee this for abnormal (blockexit generated) delinks. Therefore, CHANGE procedures which take actions that require holding the locks must check to see if they have the lock and, if not, grab and drop it themselves.

Appendix I–B
LINKING THE PIM_CLs

The PIM_CL on the MCP side is multi-connection library in a server role, and the PIM_CL on the NP side is a single Connection Library acting as a client. During its initialization, if it is to provide the PIM/PIE CL interface, the NP will link its PIM_CL to a PIM_CL connection of the MCP. Since READYCL is not available for Connection Libraries declared at DO level, the NP cannot initiate the linkage using the regular LINKLIBRARY to connect the PIM_CLs. Instead, a direct linkage mechanism is provided to the NP with the following MCP entry point:
ALGOL Declaration:

```
INTEGER PROCEDURE Link_Me_To_D0_CL
                    (My_CL_Ref
                    , D0_CL_Type
                    ,params
                    );
        VALUE       D0_CL-Type
                    ,params;
        CONNECTION  My_CL-Ref;
        INTEGER     D0_CL_Type;
        REAL        params;
Parameters:
    My_CL_Ref   The CL declared by the NP.
    D0_CL_Type  Indicates the MCP's D0 CL
                to be linked to:
                    1    PIM_CL
                    Other values are
                    reserved for future
                    use.
```

Results

The return value has the same meaning as that from the regular LINKLIBRARY.

Appendix I–C
DECLARE_PIE

A PIM invokes this procedure when it wishes to describe a PIE to the IPC Interface Manager.
ALGOL Declaration:

```
REAL PROCEDURE DECLARE_PIE(
                    PIE_NAME
                    ,PIM_ATTRIBUTE_LIST
                    ,PIE ATTRIBUTE_LIST
                    ,PIE_PARAMS
                    ,PIE_ID
                    );
        VALUE       PIE_PARAMS;
        POINTER     PIE_NAME;
        REAL ARRAY  PIM_ATTRIBUTE_LIST[0]
                    ,PIE_ATTRIBUTE_LIST [0];
        REAL        PIE_PARAMS
        INTEGER     PIE_ID;
Parameters:
    PIE-Name
```

The name used in connecting to the PIE. To avoid duplication of names it is suggested that this name contain a unique PIM name as well as a name which differentiates among the PIEs used by the PIM. If the declared PIE is using the CB interface, the MCP will pass this name to the NP (via the ICM access routine ProvideRequest) for validation when a PIE CB is connected. If the declared PIE CB is using the CL interface, the MCP will use this name as the INTERFACENAME when it links its PIE CL to that of the NP.

PIM-Attribute-List
A mask indicating the attributes for which the PIM performs validation (via PIM_ VALIDATE_ ATTRIBUTE) hen the dialog is assigned to a PIE.

PIE-Attribute-List
A mask indicating the attributes for which the PIE performs validation (via PIE_VALIDATE_ ATTRIBUTE) when the dialog is assigned to a PIE.

PIE-Parameters
  [47:16]  (unused)
  {31:16}  Attribute-List-Length
      The Attribute-Id of the highest numbered attribute represented in the Attribute-List parameters.
  [15:08]  PIE-Name-Length
      The length of PIE-Name in bytes.
  [07:08]  PIE-CB-Type
      The type of CB that Logical I/O should build and connect for dialogs using this PIE. If the declared PIE uses the CB interface the following types may be specified [4]:
        1  Vanilla_PIE_CB
        2  Strawberry_PIE-CB
        3  Chocolate_PIE_CB
      This document proposed a Type 4 to be added to indicate that the declared PIE uses the CL interface.
        4  Apple_PIE-CL PIE-Id
  The identifier assigned to the PIE by the IPC Interface Manager. (Returned)

Results:
OK
Invalid-PIM-Index
Provider-Not_Active
Unsup-PIE-CB-Type
Duplicate-PIE-Name
Unsup-Name-Length
Mask-Overlap

What is claimed is:

1. A system using multiple interfaces for enhancing data communications between a computer system and external networks comprising:

(a) Cooperative System Services interface means 12 for expediting dialog messages between a Distributed System Service unit 10 (DSS 10) and a Network Provider 20;

(b) Network Data Path interface means 30 for expediting dialog messages between said Network Provider 20 and an Input/Output Module 40;

(c) first Connection Library Interface means (10c, 20c) for establishing a dialog connection between said DSS 10 and said Network Provider 20;

(d) second Connection Library Interface means (18m–20m; 18e–20e) for controlling dialog messages, via a Ports interface (18) means of said computer system's Master Control Program 80, between said Network Provider 20 and said DSS 10;

(e) said Input/Output Module 40 for queuing message data into and out of said Network Provider 20;

(f) Network Processor means 50 providing input and output channels between said Input/Output Module 40 and external networks.

2. The system of claim 1 wherein said Cooperative Systems Service Interface means 12 includes:

(a) means to initialize said first Connection Library means (10c, 20c) for connecting said Distributed System Service unit 10 to said Network Provider 20;

(b) means, in said Network Provider 20, to receive input data from said Network Processor means 50;

(c) means for enabling said Distributed System Service unit 10 to access said input data from said Network Provider 20.

3. The system of claim 1 wherein said Cooperative Services Interface 12 includes:

(a) means to initialize said first Connection Library means (10c, 20c) for connecting said DSS 10 to said Network Provider 20;

(b) means, in said DSS 10, to transfer output data to said IOM 40 via said Network Provider 20.

4. The system of claim 1 wherein said Network Data Path Interface means 30 includes:

(a) means to initialize said Network Provider 20 with a send-data operation;

(b) means to transfer output data from said DSS 10 to said Network Processor 50 via said Network Provider 20 and said IOM 40.

5. The system of claim 4 wherein said Network Data Path Interface means 30 further includes:

(a) means to allocate a selected input buffer (20ib) in said Network Provider 20 for subsequent receipt of input message data;

(b) means to call by said Network Provider 20, of a start operation to initiate transfer of said input message data from said IOM 40;

(c) means to complete transfer of said input message data from IOM 40 to said input buffer 20ib in said Network Provider 20.

6. The system of claim 1 wherein said second Connection Library Interface means (18m–20m; 18e–20e) includes:

(a) means to initiate the setting-up of a dialog between said Master Control Program 80 and a selected Network Provider 20;

(b) means to establish a selected dialog for handling by said selected Network Provider 20;

(c) means to enable message data transfers between said DSS 10 and said Network Provider 20 via utilization of:

(c1) a Process Intercommunication Manager-Connection Library means (PIM-CLE) for managing control and data transfers between said MCP 80 and said Network Provider 20;

(c2) a Process Intercommunication Element-Connection Library means (PIE-CLE) for managing control and data transfers between said MCP 80 and said Network Provider 20.

7. In a computer system (3) operating under a Master Control Program (80) and actively cooperating with multiple interfaces to enable high speed data communications to be facilitated, a method for enhancing data communications between an external network (50) and said computer system (3) comprising the steps of:

(a) transferring dialog message data, using a Cooperative Service Interface 12, between a first service unit (Distributed System Services unit, DSS 10) and a second service unit (Network Provider 20) by enabling the sharing of lock pools and buffer pools;

(b) controlling said transfer of dialog message data via a Ports interface means (14, 18) of said Master Control Program 80 (MCP 80);

(c) transferring dialog message data between said second service unit (Network Provider 20) and an Input/Output Module 40 (IOM 40) connected to a Network Processor (50).

8. The method of claim 7 wherein step (b) includes the step of:

(b1) interfacing said Ports Interface means (14, 18) of said MCP 80, via a Connection Library means (18m–20m; 18e–20e) for connecting said second service unit (Network Provider 20) to said Ports Interface means (14, 18) for enabling said second service unit (Network Provider 20) to communicate with said IOM 40.

9. The method of claim 8 wherein step (b) further includes the step of:

(b2) utilizing a Process Inter-communications Manager Program (PIM) (30) and a Processor-Intercommunication Element (PIE) program (30) for managing the transfer of dialog messages between said Ports Interface means (14, 18) and said second service unit (Network Provider 20).

10. The method of claim 7 wherein step (c) includes the steps of:

(c1) interfacing a Connection Library means 30 between said service unit (Network Provider 20) and a Network Processor Support unit 35;

(c2) utilizing a Network Processor Support unit 35 to simulate multiple queues for holding dialog messages;

(c3) connecting said Network Processor Support unit 35 to said IOM 40 via a direct interface 32.

11. The method of claim 10 which includes the step of:

(c4) enabling said IOM 40 to provide Gather simulation functions to accumulate a series of message data from various memory locations.

12. The method of claim 11 which includes the step of:

(c5) enabling said IOM 40 to provide Scatter simulation functions to place message data in different selected locations.

* * * * *

UNITED STATES PATENT AND TRADEMARK OFFICE
CERTIFICATE OF CORRECTION

PATENT NO. : 6,101,533

DATED : August 8, 2000

INVENTOR(S) : Mark Steven Brandt, et al

It is certified that error appears in the above-identified patent and that said Letters Patent is hereby corrected as shown below:

On the Title Page, Item [54] and column 1, line 1 should read: -----MULTIPLE INTERFACE HIGH SPEED DATA COM SYSTEM AND METHOD -----.

Signed and Sealed this

Twenty-ninth Day of May, 2001

*Attest:*

NICHOLAS P. GODICI

*Attesting Officer*   *Acting Director of the United States Patent and Trademark Office*